(12) United States Patent
Hwang et al.

(10) Patent No.: US 12,501,293 B2
(45) Date of Patent: Dec. 16, 2025

(54) METHOD AND TERMINAL FOR PERFORMING RRM MEASUREMENT IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 17/635,198

(22) PCT Filed: Aug. 13, 2020

(86) PCT No.: PCT/KR2020/010722
§ 371 (c)(1),
(2) Date: Feb. 14, 2022

(87) PCT Pub. No.: WO2021/029686
PCT Pub. Date: Feb. 18, 2021

(65) Prior Publication Data
US 2022/0295318 A1    Sep. 15, 2022

(30) Foreign Application Priority Data

Aug. 14, 2019   (KR) .................. 10-2019-0099842
Nov. 7, 2019    (KR) .................. 10-2019-0142010
May 29, 2020    (KR) .................. 10-2020-0065386

(51) Int. Cl.
*H04W 24/08*   (2009.01)
*H04W 24/10*   (2009.01)
*H04W 76/28*   (2018.01)

(52) U.S. Cl.
CPC .......... *H04W 24/08* (2013.01); *H04W 24/10* (2013.01); *H04W 76/28* (2018.02)

(58) Field of Classification Search
CPC ..... H04W 24/08; H04W 24/10; H04W 76/28; H04W 24/02; H04W 48/12;
(Continued)

(56) References Cited

U.S. PATENT DOCUMENTS 8,929,237 B2   1/2015  Jung et al.
9,723,507 B2   8/2017  Edara
(Continued)

FOREIGN PATENT DOCUMENTS

CN    102823288 A    12/2012
EP    2 582 179 A1    4/2013
(Continued)

OTHER PUBLICATIONS

Ericsson, Cell re-selection measurement window, 3GPP TSG-RAN WG2 #98, Tdoc R2-1705436, Hangzhou, P.R. of China, May 15-19, 2017 (Year: 2017).*

(Continued)

*Primary Examiner* — Ayaz R Sheikh
*Assistant Examiner* — David Zhijun Sun
(74) *Attorney, Agent, or Firm* — Jefferson IP Law, LLP

(57) ABSTRACT

Provided is a method by which a user equipment (UE) performs measurement on a frequency in a wireless communication system. The method may include receiving, from a base station (BS), system information including configuration information about relaxed measurement, determining, based on the configuration information, whether criteria for the relaxed measurement are fulfilled, and performing the relaxed measurement on at least one frequency, based on a result of the determining.

8 Claims, 24 Drawing Sheets

(58) Field of Classification Search
CPC ......... H04W 52/0209; H04W 36/0085; H04W 36/30; H04W 48/08; H04W 76/27; Y02D 30/70
See application file for complete search history.

(56) References Cited

U.S. PATENT DOCUMENTS

| | | | |
|---|---|---|---|
| 9,887,786 | B2 | 2/2018 | Kim et al. |
| 10,034,217 | B2 | 7/2018 | Pani et al. |
| 2009/0088160 | A1 | 4/2009 | Pani et al. |
| 2016/0316411 | A1 | 10/2016 | Jung et al. |
| 2018/0323884 | A1* | 11/2018 | Ku ..................... H04W 24/08 |
| 2020/0029256 | A1* | 1/2020 | Rico Alvarino .. H04W 36/0085 |
| 2022/0053350 | A1* | 2/2022 | Chen .................. H04W 24/02 |
| 2022/0131596 | A1* | 4/2022 | Sharma ............... H04W 72/542 |
| 2022/0201523 | A1* | 6/2022 | Lee ..................... H04W 24/08 |
| 2022/0408513 | A1* | 12/2022 | Liu ..................... H04W 72/23 |

FOREIGN PATENT DOCUMENTS

| | | |
|---|---|---|
| EP | 2 779 745 A1 | 9/2014 |
| JP | 2014-511082 A | 5/2014 |
| KR | 10-2013-0094839 A | 8/2013 |
| KR | 10-2016-0006180 A | 1/2016 |
| KR | 10-2016-0075570 A | 6/2016 |
| WO | 2018/169663 A1 | 9/2018 |

OTHER PUBLICATIONS

UE power saving in RRM Measurements, 3GPP TSG RAN WG1 #96, R1-1901711, Athens, Greece, Feb. 25-Mar. 1, 2019 (Year: 2019).*

Extended European Search Report dated Aug. 23, 2022, issued in a counterpart European Application No. 20852685.5.

VIVO; UE power saving in RRM Measurements; 3GPP TSG RAN WG1 #96; R1-1901711; Feb. 16, 2019, Athens, Greece.

ERICSSON; Cell re-selection measurement window; 3GPP TSG-RAN WG2 #98; Tdoc R2-1705436; May 14, 2017, Hangzhou, P.R. of China.

International Search Report dated Nov. 6, 2020, issued in an International Application No. PCT /KR2020/010722.

Chinese Office Action dated Mar. 28, 2024, issued in Chinese Patent Application No. 202080057313.4.

European Office Action dated Jan. 29, 2024, issued in European Patent Application No. 20852685.5.

Korean Office Action dated May 20, 2024, issued in Korean Patent Application No. 10-2022-7004806.

Chinese Office Action dated Nov. 28, 2024, issued in Chinese Patent Application No. 202080057313.4.

Nokia et al., Power consumption reduction in RRM measurements, R2-1906697, 3GPP TSG-RAN WG2 Meeting #106, May 3, 2019.

LG Electronics Inc., Considerations on conditions for performing RRM measurement relaxation, R2-1907891, 3GPP TSG-RAN WG2 Meeting #106, May 3, 2019.

Nokia et al., Power consumption reduction in RRM measurements, R2-1904309, 3GPP TSG-RAN WG2 Meeting #105bis, Mar. 28, 2019.

CATT et al., New WID: UE Power Saving in NR, RP-191607, 3GPP TSG RAN Meetings #84, Jun. 7, 2019.

Chinese Office Action dated Feb. 26, 2025, issued in Chinese Patent Application No. 202080057313.4.

* cited by examiner

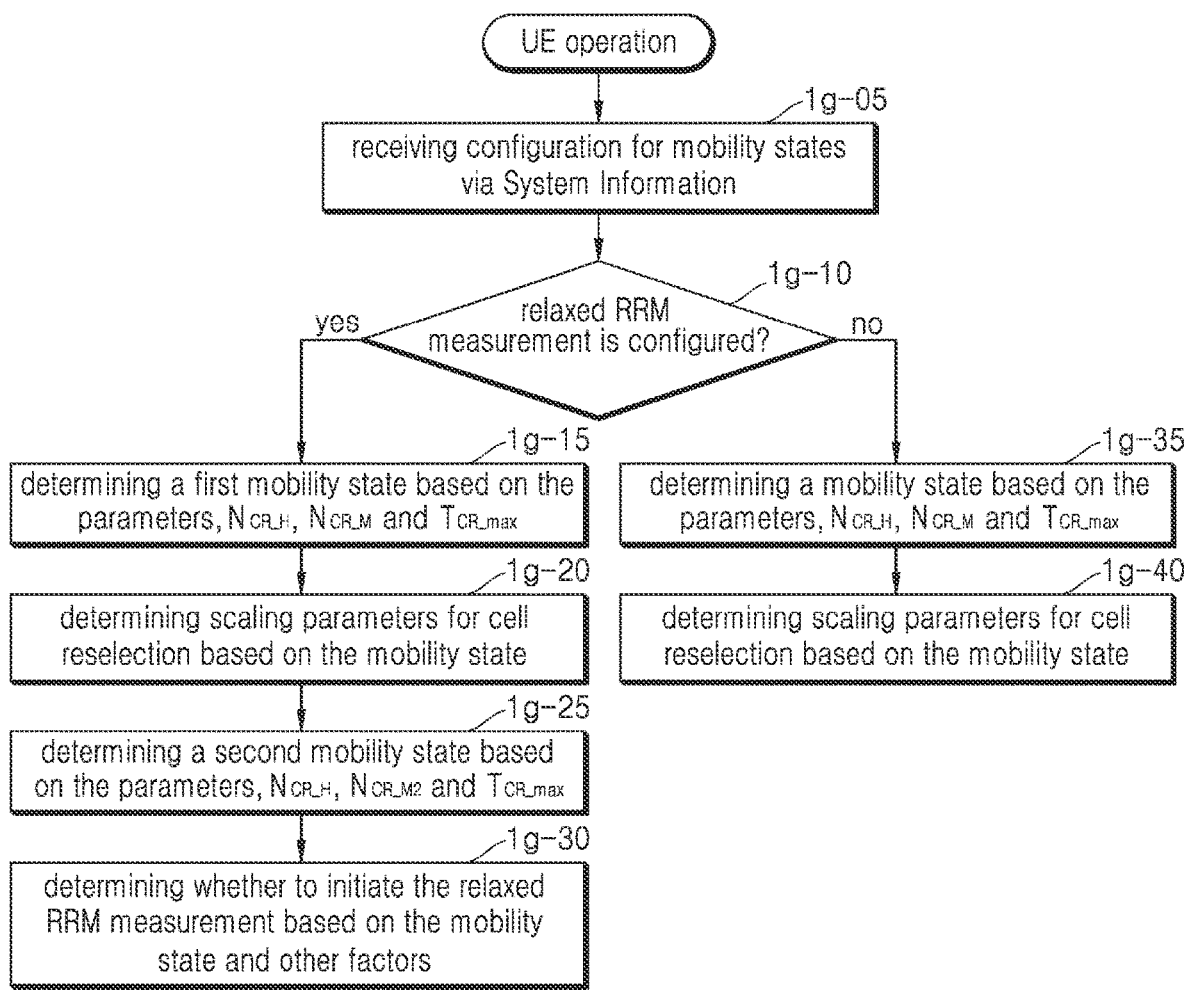

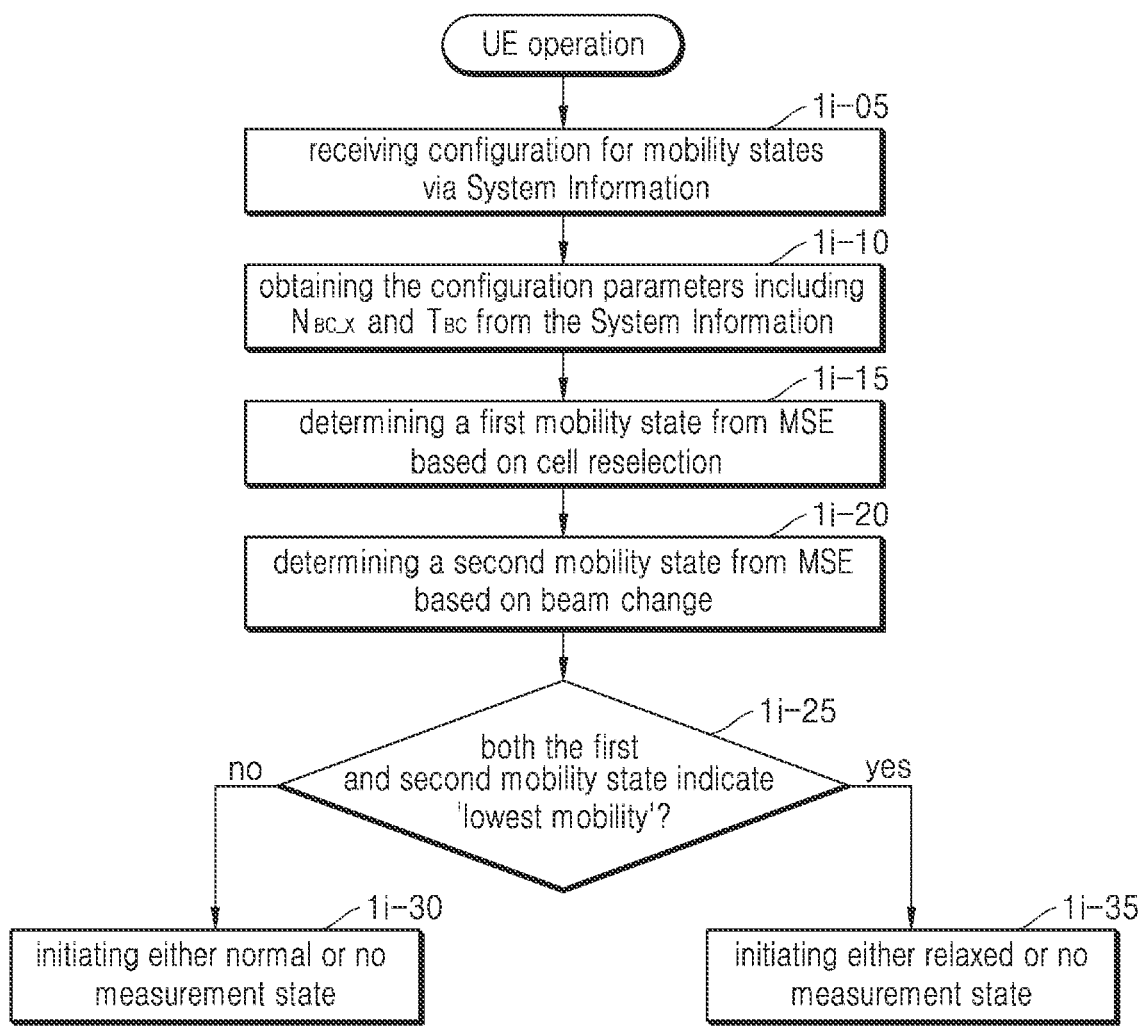

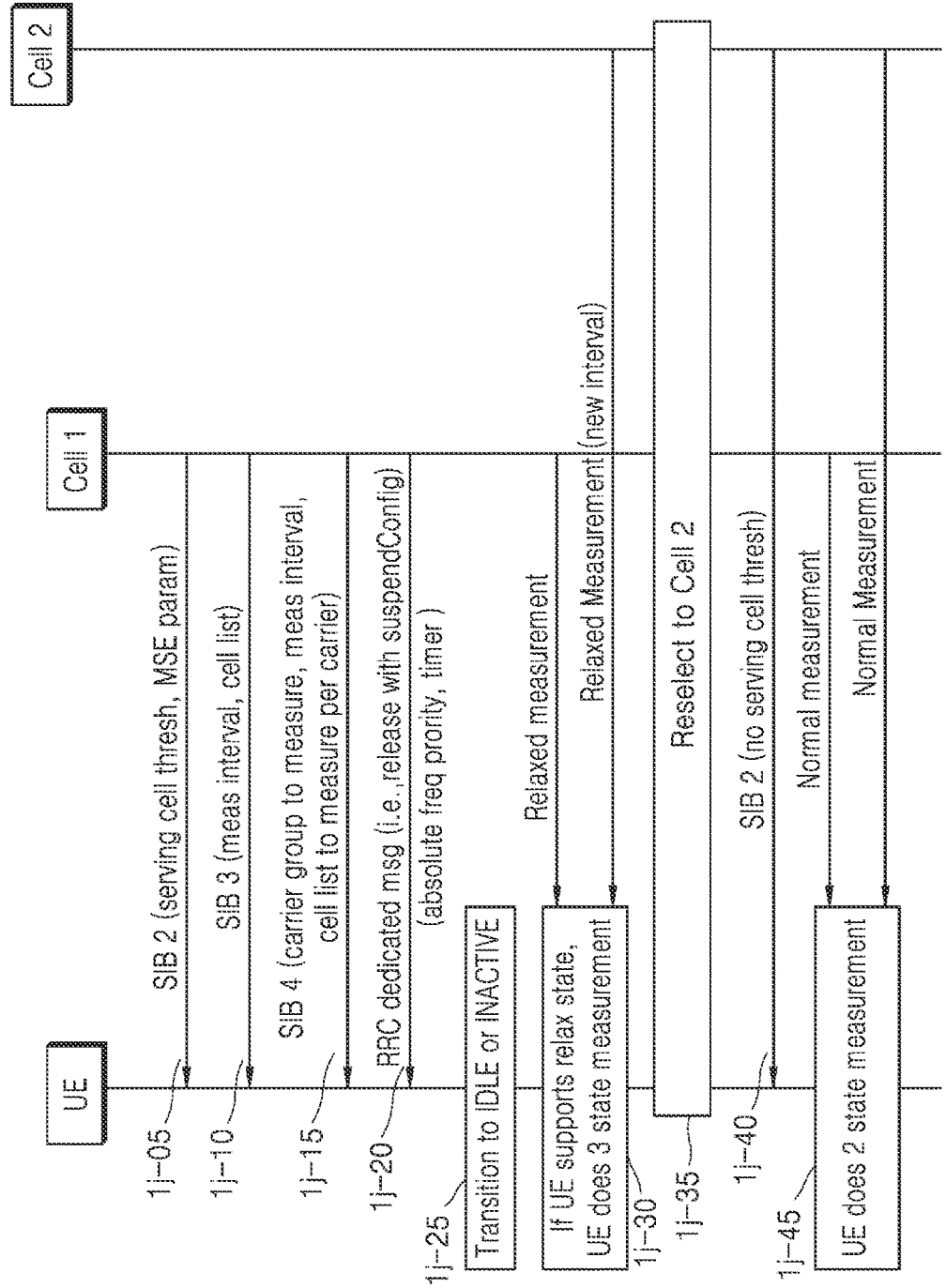

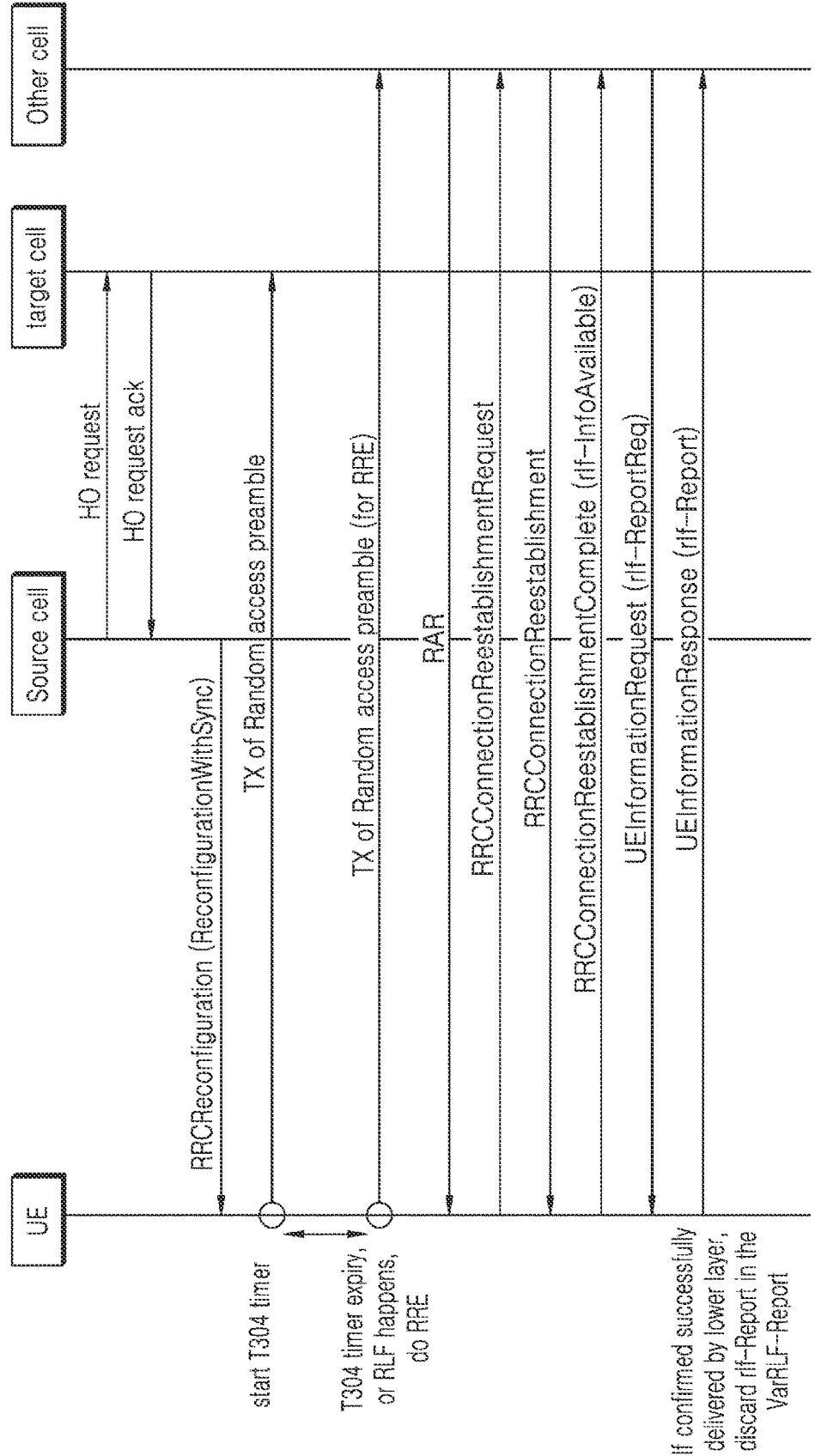

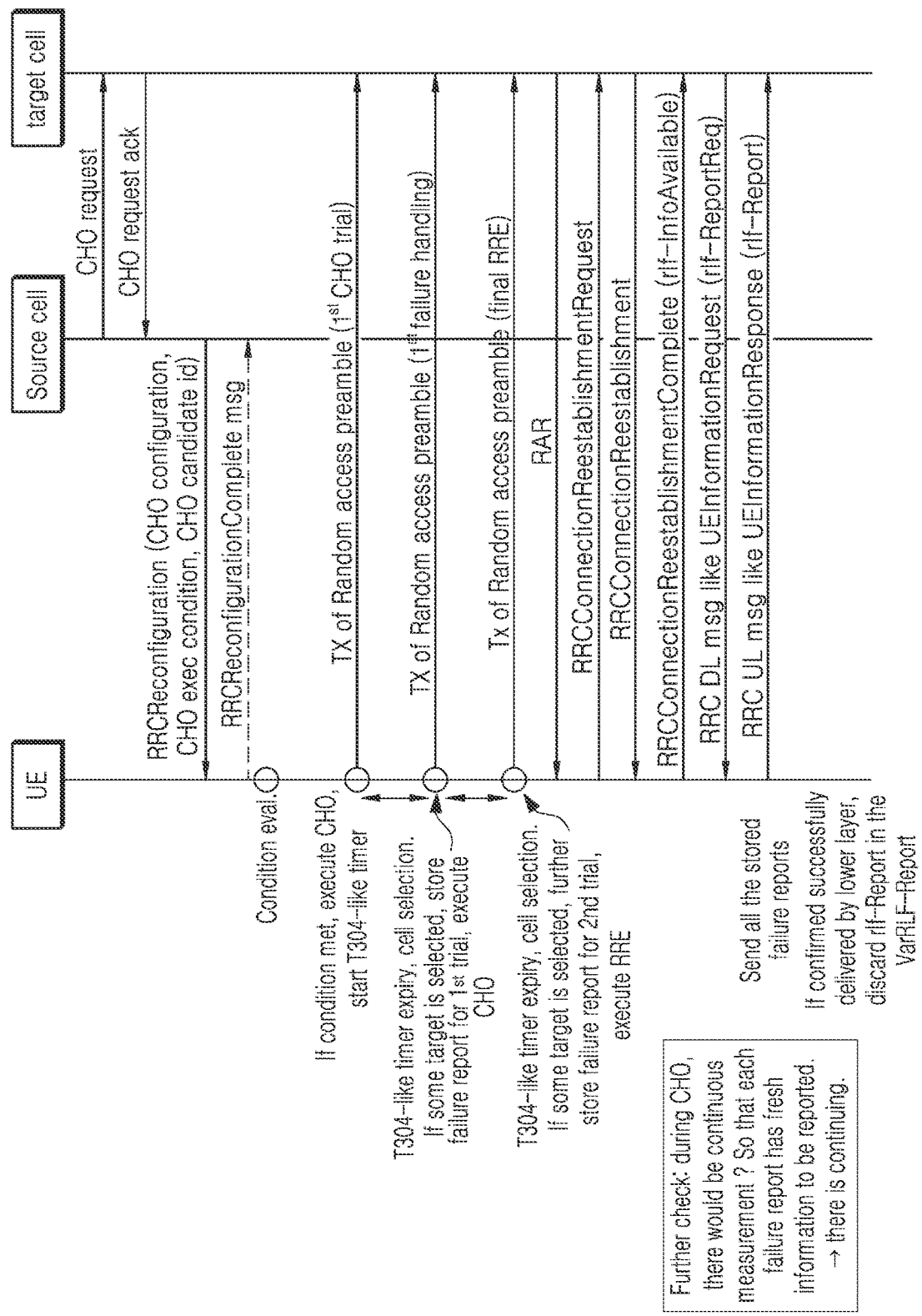

METHOD AND TERMINAL FOR PERFORMING RRM MEASUREMENT IN WIRELESS COMMUNICATION SYSTEM

TECHNICAL FIELD

The disclosure relates to a method and terminal for performing radio resource management (RRM) measurement in a wireless communication system.

Also, the disclosure relates to a method and apparatus for performing failure reporting for handover in a wireless communication system.

BACKGROUND ART

In order to meet increasing demand with respect to wireless data traffic after the commercialization of 4th generation (4G) communication systems, efforts have been made to develop evolved 5th generation (5G) system or pre-5G communication system. For this reason, 5G or pre-5G communication systems are called 'beyond 4G network' communication systems or 'post long term evolution (post-LTE)' systems.

In order to achieve high data rates, implementation of 5G communication systems in an ultra-high frequency or millimeter-wave (mmWave) band (e.g., a 60 GHz band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

Also, in order to improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, or the like are being implemented by using techniques including beamforming, MIMO, array antennas, or the like. Application of Cloud-RAN as the above-described big data processing technology may be an example of convergence of 5G communication technology and IoT technology.

Because various services may be provided due to the aforementioned technical features and the development of mobile communication systems, methods for effectively providing these services are required.

DISCLOSURE

Technical Solution

The disclosure provides an apparatus and method for effectively providing a service in a mobile communication system.

According to an embodiment of the disclosure, when a user equipment (UE) is in an inactive or idle mode, a measurement state of the UE may be determined, and when the measurement state of the UE is a relaxed measurement state, a target to be measured, the number of measurements, or the like are controlled to prevent power consumption of the UE due to unnecessary measurement.

Also, the disclosure provides a method and apparatus for performing failure reporting for handover in a wireless communication system.

Advantageous Effects

According to an embodiment of the disclosure, in a mobile communication system, for a case where a user equipment (UE) has small mobility or is located in a center of a cell and thus does not require a measurement operation for mobility, the UE performs measurement with a decrease in a frequency to be measured, a cell to be measured, a measurement trial time, or the like, such that power consumption of the UE due to measurement may be reduced.

Also, according to an embodiment of the disclosure, when a UE in an idle state or an inactive state performs measurement for mobility, if it is determined that the UE is in a relaxed measurement state, targets to be measured are limited with respect to a measurement time, a cell to be measured, and a frequency to be measured, such that power consumption of the UE due to measurement may be reduced.

Also, disclosed embodiments may effectively provide information about a handover failure in a wireless communication system.

DESCRIPTION OF DRAWINGS

FIG. 1G is a flowchart of UE operations of determining relaxed RRM measurement according to a second embodiment of the disclosure.

FIG. 1I is a flowchart of operations of determining, by a UE, relaxed RRM measurement by considering the number of beam switching, according to an embodiment of the disclosure.

FIG. 1J is a diagram illustrating a signal flow between a base station (BS) and a UE for relaxed measurement state operations according to an embodiment of the disclosure.

FIG. 2G is a flowchart of operations related to handover failure.

FIG. 2J is a flowchart for describing UE operations of a case where an initial failure is conditional handover, in a method of transmitting, by a UE, a failure report after occurrence of two conditional handover failures.

BEST MODE

Figure 1A:
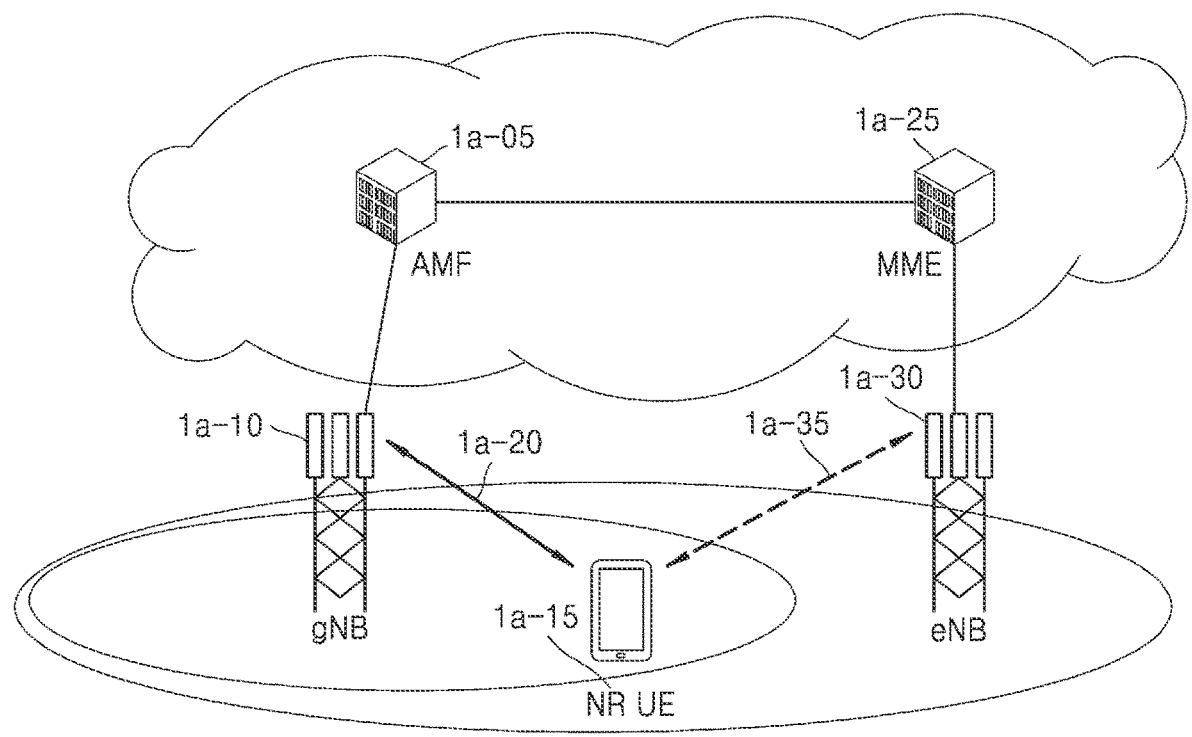
FIG. 1A is a diagram illustrating architecture of a next-generation mobile communication system, according to an embodiment of the disclosure.

According to an embodiment of the disclosure, a method, performed by a user equipment (UE), of performing radio resource management (RRM) measurement in a wireless communication system may include: receiving, from a base station (BS), system information including information for mobility state estimation (MSI); determining a mobility state of the UE based on the information for MSI; determining whether to perform relaxed RRM measurement based on the determined mobility state; and performing relaxed RRM measurement, based on a result of determining whether to perform RRM measurement.

According to an embodiment of the disclosure, a method, performed by a UE, of performing measurement on a frequency in a wireless communication system may include: receiving, from a BS, system information including configuration information about relaxed measurement; determining, based on the configuration information, whether criteria for the relaxed measurement are fulfilled; and performing the relaxed measurement on at least one frequency, based on a result of the determining.

According to an embodiment of the disclosure, the configuration information about the relaxed measurement may include at least one threshold from among a first Srxlev (selection receive level value) threshold for a Srxlev or a first Squal (cell selection quality value) threshold for a Squal.

According to an embodiment of the disclosure, the criteria for the relaxed measurement may include: a condition that Srxlev of a serving cell of the UE is greater than the first Srxlev threshold; and a condition that, when the first Squal threshold is included in the configuration information, Squal of the serving cell is greater than the first Squal threshold.

According to an embodiment of the disclosure, the first Srxlev threshold may be less than or equal to a second Srxlev threshold for unrelaxed measurement, and the first Squal threshold may be less than or equal to a second Squal threshold for unrelaxed measurement.

According to an embodiment of the disclosure, the at least one frequency may include at least one frequency from among an intra-frequency, an inter-frequency, or an inter-radio access technology (RAT) frequency.

According to an embodiment of the disclosure, the performing of the relaxed measurement on the at least one frequency may include performing the relaxed measurement on the at least one frequency according to a first measurement period about relaxed measurement, the first measurement period is longer than a second measurement period about unrelaxed measurement, and a unit of each of the first measurement period and the second measurement period is a number of discontinuous reception cycles (DRXs).

According to an embodiment of the disclosure, a UE for performing measurement on a frequency in a wireless communication system may include: a transceiver; and at least one processor configured to: control the transceiver to receive, from a BS, system information including configuration information about relaxed measurement; determine, based on the configuration information, whether criteria for the relaxed measurement are fulfilled; and perform the relaxed measurement on at least one frequency, based on a result of the determining.

According to an embodiment of the disclosure, a method, performed by a BS, of broadcasting measurement of a frequency in a wireless communication system may include: broadcasting system information including configuration information about relaxed measurement, wherein the configuration information about the relaxed measurement includes at least one threshold from among a first Srxlev threshold of a cell selection receive level value (Srxlev) or a first Squal threshold of a cell selection quality value (Squal), and wherein the first Srxlev threshold and the first Squal threshold are used by a UE receiving the system information to perform relaxed measurement on at least one frequency, when a first condition that Srxlev of a serving cell of the UE is greater than the first Srxlev threshold and a second condition that, when the first Squal threshold is included in the configuration information, Squal of the serving cell is greater than the first Squal threshold are fulfilled.

According to an embodiment of the disclosure, the first Srxlev threshold may be less than or equal to a second Srxlev threshold for unrelaxed measurement, and the first Squal threshold may be less than or equal to a second Squal threshold for unrelaxed measurement.

According to an embodiment of the disclosure, the at least one frequency may include at least one frequency from among an intra-frequency, an inter-frequency, or an inter-RAT frequency.

According to an embodiment of the disclosure, a BS for broadcasting measurement of a frequency in a wireless communication system may include: a transceiver; and at least one processor configured to control the transceiver to broadcast system information including configuration information about relaxed measurement, wherein the configuration information about the relaxed measurement includes at least one threshold from among a first Srxlev threshold of a cell selection receive level value (Srxlev) or a first Squal threshold of a cell selection quality value (Squal), and wherein the first Srxlev threshold and the first Squal threshold are used by a UE receiving the system information to perform relaxed measurement on at least one frequency, when a first condition that Srxlev of a serving cell of the UE is greater than the first Srxlev threshold and a second condition that, when the first Squal threshold is included in the configuration information, Squal of the serving cell is greater than the first Squal threshold are fulfilled.

According to an embodiment of the disclosure, a method, performed by a UE, of reporting a failure for handover in a wireless communication system may include: performing a connection re-establishment procedure, due to consecutive failures in conditional handover; transmitting, to a BS via a connection re-establishment complete message, information indicating existence of a failure report due to a conditional handover failure; receiving, from the BS, a downlink radio resource control (DL RRC) message including a request of the failure report; and transmitting, based on the request of the failure report, a uplink (UL) RRC message including the failure report to the BS.

MODE FOR INVENTION

Embodiments of the disclosure will now be described more fully with reference to the accompanying drawings.

In the following description of embodiments of the disclosure, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, according to an embodiment of the disclosure, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

Hereinafter, operation principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire description of the present specification. In the following description, the term "base station" refers to an entity for allocating resources to a user equipment and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

Hereinafter, the disclosure relates to a technology for a UE to receive broadcasting information from a BS in a wireless communication system. The disclosure relates to a communication scheme and a system therefor by which a 5th generation (5G) communication system for supporting a higher data rate after a 4th generation (4G) system is converged with the Internet of things (IoT) technology. The disclosure is applicable to intelligent services (e.g., smart home, smart building, smart city, smart car or connected car, health care, digital education, retail, security, and safety services) based on 5G communication technology and the IoT technology.

In the descriptions below, the term indicating broadcasting information, the term indicating control information, the term related to communication coverage, the term (e.g., event) indicating a change in a state, the term indicating network entities, the term indicating message, the term indicating configuration elements of an apparatus, or the like are exemplified for convenience of descriptions. Accordingly, the disclosure is not limited to terms to be described below, and other terms indicating objects having equal technical meanings may be used.

For convenience of descriptions, the disclosure uses some terms and names defined in the 3rd Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a base station described by an eNB may represent a gNB. In the disclosure, the term "terminal" may refer to not only mobile phones, narrowband IoT (NB-IoT) devices, and sensors but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multiconnection scheme distinguishes between data or control information of different users by assigning time-frequency resources for the data or control information of the users not to overlap each other, i.e., to achieve orthogonality therebetween.

Post-LTE system, that is, 5G system needs to simultaneously support services capable of reflecting and satisfying various requirements of users, service providers, etc. Services considered for the 5G system includes enhanced mobile broadband (eMBB), massive machine-type communication (mMTC), ultra-reliability low-latency communication (URLLC) services or the like.

According to an embodiment of the disclosure, the eMBB service may be aimed to provide a more enhanced data rate compared to a data rate supported by LTE, LTE-A, or LTE-Pro. For example, the eMBB service in the 5G communication systems needs to provide a maximum data rate of 20 gigabits per second (Gbps) for a DL and provide a maximum data rate of 10 Gbps for a UL in view of a single BS. At the same time, the 5G communication system has to provide an increased user perceived data rate. In order to fulfill these requirements, the 5G communication system may require enhanced transmission/reception technologies including further enhanced multiple-input and multiple-output (MIMO). The data rate required for the 5G communication system may be satisfied by using a frequency bandwidth wider than 20 megahertz (MHz) in a frequency band of 3 to 6 GHz or over 6 GHz compared to the LTE system currently using a 2 GHz band.

At the same time, the mMTC service is considered for the 5G communication systems to support application services such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km2. In addition, because a UE supporting mMTC may be located in a shadow zone, e.g., a basement of a building, due to service characteristics, the mMTC service may require a wider coverage compared to other services provided by the 5G communication systems. The UE supporting mMTC needs to be low-priced, and is not able to frequently replace battery and thus requires a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc., and may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than 10-5. Therefore, for the URLLC service, the 5G communication systems need to provide a smaller transmit time interval (TTI) compared to other services and, at the same time, may be required to broadly allocate resources in a frequency band to ensure reliability of a communication link. However, the above-described mMTC, URLLC, and eMBB services are merely examples and the types of services to which the disclosure is applicable are not limited thereto.

The services considered in the 5G communication system need to be provided after being converged based on one framework. That is, in order to efficiently managing and controlling resources, it is preferable that the services are combined into one system and then are controlled and transmitted, rather than independently operating.

Although LTE, LTE-A, LTE Pro, or New Radio (NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art. Hereinafter, frame architectures of LTE, LTE-A, and 5G systems will now be described with reference to drawings, and then a design concept of the 5G system will now be described.

Hereinafter, a normal measurement state, a relaxed measurement state, and no measurement state respectively indicate a third measurement state, a second measurement state, and a first measurement state, and the term of states may be changed when required.

FIG. 1A is a diagram illustrating architecture of a next-generation mobile communication system, according to an embodiment of the disclosure.

Referring to FIG. 1A, a radio access network of the next-generation mobile communication system (e.g., a NR system) includes a next-generation BS (e.g., a new radio node B, hereinafter, gNB) 1a-10 and a new radio core network (AMF) 1a-05. A new radio user equipment (hereinafter, NR UE or terminal) 1a-15 may access an external network via the gNB 1a-10 and the AMF 1a-05. In an embodiment, the NR UE may be referred to as the UE.

In FIG. 1A, the gNB 1a-10 may correspond to an evolved node B (eNB) of a legacy LTE system. The gNB 1a-10 may be connected to the NR UE 1a-15 via wireless channels and may provide superior services compared to a legacy node B (1a-20). In the next-generation mobile communication system, all user traffic data may be serviced via shared channels, and therefore, an entity for performing scheduling by collating, for example, buffer state information of UEs, available transmit power state information, and channel state information may be required and the gNB 1a-10 may operate as such an entity. In general, one gNB 1a-10 may control a plurality of cells. The next-generation mobile communication system may have a bandwidth greater than the maximum bandwidth of the legacy LTE system so as to achieve an ultrahigh data rate, and may additionally associate a beamforming technology with OFDM as a radio access technology. Also, an adaptive modulation & coding (AMC) scheme may be applied to determine a modulation scheme and a channel coding rate in accordance with a channel state of the UE. The AMF 1a-05 may perform functions such as mobility support, bearer establishment, and quality of service (QoS) configuration. The AMF 1a-05 is an entity for performing a mobility management function and various control functions on the UE and may be connected to a plurality of BSs. Also, the next-generation mobile communication system may cooperate with the legacy LTE system, and the AMF 1a-05 may be connected to a mobility management entity (MME) 1a-25 via a network interface. The MME 1a-25 may be connected to an eNB 1a-30 that is a legacy BS. The UE that supports LTE-NR Dual Connectivity may transceive data while maintaining connection not only to the gNB but also to the eNB (1a-35).

Figure 1B:
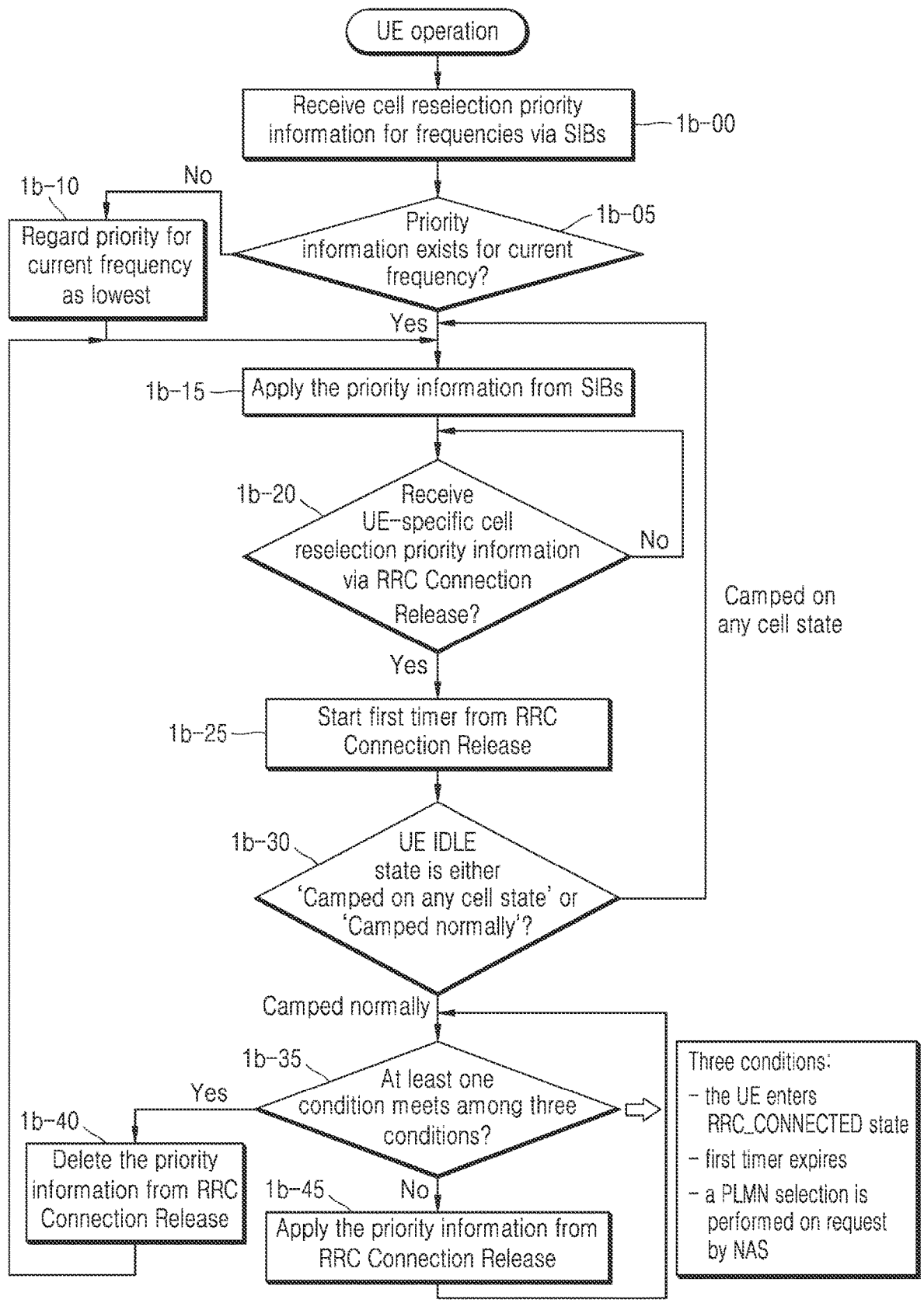
FIG. 1B is a diagram for describing a procedure in which frequency priority information for cell reselection is broadcast via a system information block (SIB) or is applied to a particular user equipment (UE) via a radio resource control (RRC) Connection Release message that is dedicated RRC signaling, according to an embodiment of the disclosure.

FIG. 1B is a diagram for describing a procedure in which frequency priority information for cell reselection in the LTE technology is broadcast via a system information block (SIB) or is applied to a particular UE via a radio resource control (RRC) Connection Release message that is dedicated RRC signaling, according to an embodiment of the disclosure.

The cell reselection refers to a procedure in which a moving UE reselects a serving cell so as to access a cell with a best channel state. A network may control cell reselections of UEs in an IDLE mode by allocating priorities to frequencies. For example, if one UE has received priority information with respect to two frequencies f1 and f2, and f1 has higher priority than f2, it is highly probable that a UE in f1 stays in f1. Also, even when a UE is in f2, if a channel state of f2 is not good, the UE attempts to transition to f1. Priority information about frequency may be broadcast via an SIB or may be provided to a particular UE via an RRC Connection Release message that is dedicated RRC signaling. Even when a UE already has priority information about frequencies via an SIB, if the UE is provided UE-specific priority information by RRC signaling, the priority information via the SIB may not be considered. Priority information about each frequency may be transmitted to a UE via cellReselectionPriority information element (IE) as below, and the UE may be allocated one of priorities of a total of X+1 levels. When a value of cellReselectionPriority is low, it means that priority for a frequency corresponding to the value is low. That is, '0' indicates the lowest priority.

CellReselectionPriority Information Element
  ASN1START
  TAG-CELLRESELECTIONPRIORITY-START
  CellReselectionPriority:=INTEGER (0 . . . 7)
  TAG-CELLRESELECTIONPRIORITY-STOP
  ASN1STOP Frequencies of inter-radio access technologies (RATs) cannot be allocated same priority. If an IDLE state of a UE is 'camped on any cell state', the UE may apply frequency priority information provided via an SIB, and may only store priority information without using the priority information provided by RRC signaling. cellReselectionPriority IE is an optional IE and may not exist. In a case where cellReselectionPriority IE does not exist, priority information about a corresponding frequency has not been allocated. Here, the UE may regard priority for the corresponding frequency as a lowest level.

Referring to FIG. 1B, in operation 1b-00, the UE may be provided, via SIBs, priority information about frequencies used by not only an Evolved Universal Terrestrial Radio Access (EUTRA) but also a different RAT. However, it is not essentially true that priority information is provided for all frequencies. Priority information about a frequency of a serving cell on which the UE currently camps may not be provided.

In operation 1b-05, the UE identifies whether priority information about a frequency of a current serving cell is provided. If the priority information about the frequency of the current serving cell is not provided, the UE may regard priority of the frequency of the current serving cell as a lowest level.

In operation 1b-15, the UE may apply priority information about each frequency. When the UE receives an RRC Connection Release message from a BS, the UE transitions from a Connected mode to an IDLE mode. The RRC message may include frequency priority information. The frequency priority information included in the RRC message may be UE-specific information and may be applied in priority over the frequency priority information provided via the SIB. Therefore, in operation 1b-20, the UE may identify whether the RRC message includes frequency priority information. If the RRC message includes the frequency priority information, the UE may start a first timer in operation 1b-25 by applying a first timer value co-included in the RRC message.

The UE may determine whether a current IDLE mode state is 'camped on any cell state' or 'camped normally state' in operation 1b-30. 'camped normally state' refers to a state in which a UE camps on a suitable cell. 'Suitable cell' may be a cell capable of providing a normal service to a UE and may include cells that fulfill detailed conditions below.

A cell corresponds to a selected public land mobile network (PLMN), a registered PLMN, or a PLMN in an equivalent PLMN list A cell that is not barred A cell that fulfills cell selection criterion 'camped on any cell state' refers to a state in which a UE camps on an acceptable cell because the UE cannot camp on a suitable cell. 'Acceptable cell' cannot provide a normal service, and for example, the UE may only attempt an emergency call. The acceptable cell may include cells that fulfill conditions below.

A cell that is not barred

A cell that fulfills cell selection criterion

If a UE is in an IDLE mode of 'camped on any cell state', the UE does not apply the priority information provided from the RRC Connection Release message, but returns to operation 1b-15 and applies the frequency priority information provided via the SIB. If a UE is in an IDLE mode of 'camped normally', the UE determines, in operation 1b-35, whether at least one condition among three conditions below is fulfilled. The three conditions are as below.

The UE transitions to a connected mode

The first timer expires

A PLMN selection procedure is performed, in response to a request by a non access stratum (NAS)

If any condition among the conditions above is fulfilled, the UE discards the priority information provided from the RRC Connection Release message in operation 1b-40, and returns to operation 1b-15 and applies the frequency priority information provided via the SIB. Alternatively, if any condition is not fulfilled, the UE applies the priority information provided from the RRC Connection Release message in operation 1b-45.

Frequency priority information may affect measurement by the UE with respect to a particular frequency. The UE may always perform measurement on a frequency with higher priority than a current serving cell. However, with respect to an intra-frequency equal to the serving cell or an inter-frequency with priority equal to or lower than priority of the serving cell, the UE may not always perform measurement so as to save power. When a channel QoS of the serving cell is equal to or less than a particular threshold, the UE may perform measurement. Cell reselection is performed to move to a cell of which channel state is suitable, but however, when a channel QoS of the current serving cell is suitable, the UE may not have a reason to switch to a frequency with same or lower priority. Therefore, in order to reduce power consumption due to unnecessary channel measurement, the UE may determine whether to perform measurement, based on a particular threshold.

With respect to an intra-frequency, when a QoS (i.e., Srxlev or Squal) of a serving cell is equal to or lower than a particular threshold Sintrasearch (s-IntraSearchP and s-IntraSearchQ), the UE may perform channel measurement on other cells of the intra-frequency. s-IntraSearchP is a Reference Signals Received Power (RSRP)-based threshold, and s-IntraSearchQ is a Reference Signal Received Quality (RSRQ)-based threshold. When an RSRP of a measured serving cell is greater than the threshold s-IntraSearchP and an RSRQ thereof is greater than the threshold s-IntraSearchQ, the UE may not perform intra-frequency measurement.

With respect to an inter-frequency with same or lower priority, when a QoS (i.e., Srxlev or Squal) of a serving cell is equal to or lower than a particular threshold Snonintrasearch (s-NonIntraSearchP and s-NonIntraSearchQ), the UE may perform channel measurement on cells of the inter-frequency. s-NonIntraSearchP is an RSRP-based threshold, and s-NonIntraSearchQ is an RSRQ-based threshold. When an RSRP of the measured serving cell is greater than a threshold s-NonIntraSearchP, and an RSRQ thereof is greater than a threshold s-NonIntraSearchQ, the UE may not perform inter-frequency measurement.

In the disclosure, it is defined that, as 'measurement state' of a UE, a state in which the UE performs channel measurement in an intra-frequency or an inter-frequency by comparing it with thresholds is defined as 'normal measurement state', and a state otherwise is defined as 'no measurement state'. Obviously, the UE may always perform serving cell measurement, regardless of the measurement state described above.

While the UE performs measurement, if a channel QoS of a cell on a frequency with high priority is higher than a particular threshold ThreshX-high, the UE may reselect the cell on the frequency with high priority, as a serving cell. For example, when a channel QoS of a cell on a frequency with low priority is higher than particular threshold ThreshX-low, and a QoS of a serving cell becomes lower than Thresh-Serving-low, the UE may reselect the cell on the frequency with low priority, as a serving cell.

Figure 1C:
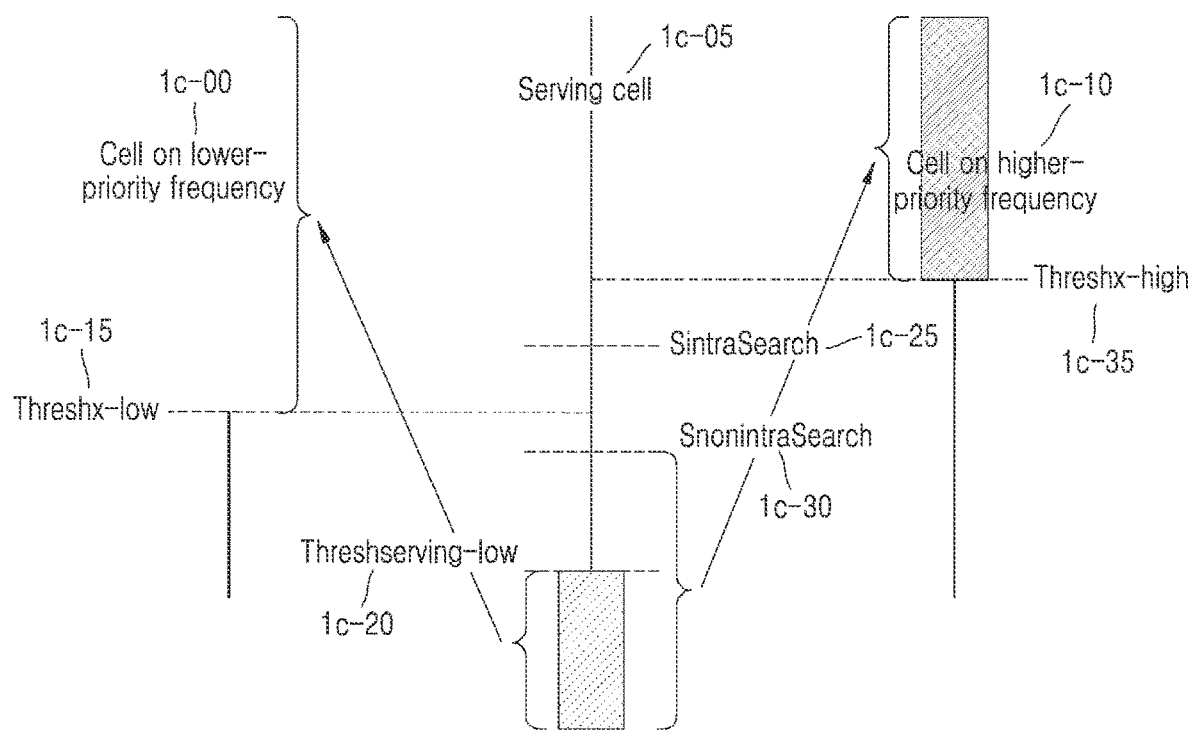
FIG. 1C is a diagram for describing a method by which a UE performs cell reselection according to an embodiment of the disclosure.

FIG. 1C is a diagram for describing a method by which a UE performs cell reselection according to an embodiment of the disclosure.

Referring to FIG. 1C, the UE always performs inter-freq/RAT measurement on a frequency or a RAT with high priority, regardless of measurement signal power with respect to a serving cell. When the measurement signal power with respect to the serving cell is lower than SintraSearch 1c-25, the UE performs intra-freq measurement. When the measurement signal power with respect to the serving cell is lower than SnonintraSearch 1c-30, the UE performs inter-freq/RAT measurement on a frequency with priority equal to or lower than a frequency of a current serving cell. The reason UE-measurement is stepwise triggered is to reduce power consumption of the UE due to measurement of neighboring cells.

If a channel QoS of a cell 1c-10 on a frequency with high priority is higher than a particular threshold ThreshX-high 1c-35, the UE reselects the cell on the frequency with high priority, as a serving cell. When a channel QoS of a cell 1c-00 on a frequency with low priority is higher than a particular threshold ThreshX-low 1c-15, and a QoS of a serving cell becomes lower than ThreshServing-low 1c-20, the UE reselects the cell on the frequency with low priority, as a serving cell.

In cell reelection, the UE may consider received signal power (RSRP) or received signal quality (RSRQ). The received signal power or received signal quality indicates a value (i.e., Srxlev or Squal) calculated as S-criteria.

Srxlev=Qrxlevmeas−(Qrxlevmin+Qrxlevminoffset)−Pcompensation−Qoffsettemp

Squal=Qqualmeas−(Qqualmin+Qqualminoffset)−Qoffsettemp

Various parameters including Srxlev and Squal may be defined as in Table 1 below.

TABLE 1

| | |
|---|---|
| Srxlev | Cell selection RX level value (dB) |
| Squal | Cell selection quality value (dB) |
| Qoffset$_{temp}$ | Offset temporarily applied to a cell as specified in TS 38.331 [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Qrxlevmin is obtained from q-RxLevMinSUL,if present, in SIB1, SIB2 and SIB4, additionally, if Q$_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if Q$_{rxlevminoffsetcell}$ is present in SIB3 and SIB4 for the concerned cell, this cell specific offset is added to the corresponding Qrxlevmin to achieve the required minimum RX level in the concerned cell. |
| Q$_{qualmin}$ | Minimum required quality level in the cell (dB). Additionally, if Q$_{qualminoffsetcell}$ is signalled for the concerned cell, this cell specific offset is added to achieve the required minimum quality level in the concerned cell. |
| Q$_{rxlevminoffset}$ | Offset to the signalled Q$_{rxlevmin}$ taken into account in the Srxlev evaluation as a result of a periodic search for a higher priority PLMN while camped normally in a VPLMN, as specified in TS 23.122 [9]. |
| Q$_{qualminoffset}$ | Offset to the signalled Q$_{qualmin}$ taken into account in the Squal evaluation as a result of a periodic search for a higher priority PLMN while camped normally in a VPLMN, as specified in TS 23.122 [9]. |
| P$_{compensation}$ | If the UE supports the additionalPmax in the NR-NS-PmaxList, if present, in SIB1, SIB2 and SIB4: max(P$_{EMAX1}$ − P$_{PowerClass}$, 0) − (min(P$_{EMAX2}$, P$_{PowerClass}$) − min(P$_{EMAX1}$, P$_{PowerClass}$)) (dB); else: Max(P$_{EMAX1}$ − P$_{PowerClass}$, 0) (dB) |
| P$_{EMAX1}$, P$_{EMAX2}$ | Maximum TX power level of a UE may use when transmitting on the uplink in the cell (dBm) defined as P$_{EMAX}$ in TS 38.101 [15]. If UE supports SUL frequency for this cell, P$_{EMAX1}$ and P$_{EMAX2}$ are obtained from the p-Max for SUL in SIB1 and NR-NS-PmaxList for SUL respectively in SIB1, SIB2 and SIB4 as specified in TS 38.331 [3], else P$_{EMAX1}$ and P$_{EMAX2}$ are obtained from the p-Max and NR-NS-PmaxList respectively in SIB1, SIB2 and SIB4 for normal UL as specified in TS 38.331 [3]. |
| P$_{PowerClass}$ | Maximum RF output power of the UE (dBm) according to the UE power class as defined in TS 38.101-1 [15]. |

Figure 1D:
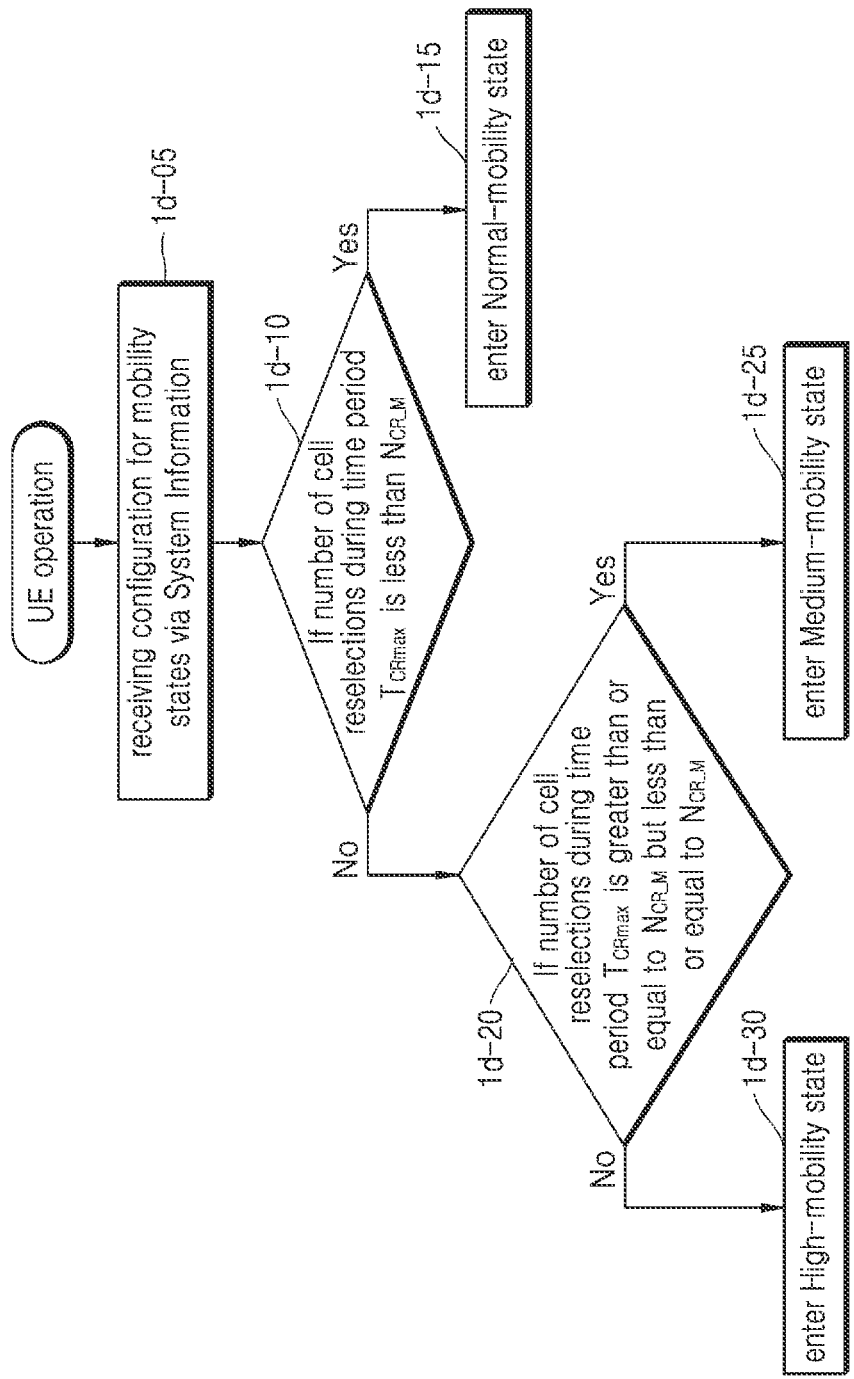
FIG. 1D is a flowchart of operations of determining, by a UE, a mobility state according to an embodiment of the disclosure.

FIG. 1D is a flowchart of operations of determining, by a UE, a mobility state according to an embodiment of the disclosure.

The mobility state is used to scale parameters such as Qhyst or Treselection related to cell reelection. The mobility state is classified into Normal-mobility state, Medium-mobility state, and High-mobility state. In general, High-mobility state refers to highest UE mobility. The mobility state may be determined by using a method to be described below with reference to operations 1d-05 to 1d-30.

Referring to FIG. 1D, in operation 1d-05, the UE receives, from a BS, system information including configuration parameters necessary for determining a mobility state. The configuration parameters may include TCRmax, NCR_H, NCR_M and TCRmaxHyst. TCRmax indicates a time period for counting the number of cell reselections, and NCR_H and NCR_M are thresholds of the number of cell reselections for determining the mobility state. TCRmaxHyst refers to one time period, and when the UE cannot maintain a determination formula of a determined mobility state during a time period of TCRmaxHyst, the UE enters a Normal-mobility state. A mobility state estimation (MSE) procedure is as below.

In operation 1d-10, the UE determines whether the number of cell reselections performed during the time period of TCRmax is less than the threshold NCR_M.

In operation 1d-15, when the number of cell reselections performed during the time period of TCRmax is less than the threshold NCR_M, the UE regards a current mobility state as Normal-mobility state.

In operation 1d-20, the UE determines whether the number of cell reselections performed during the time period of TCRmax is equal to or greater than the threshold NCR_M and is equal to or less than the threshold NCR_H.

In operation 1d-25, when the number of cell reselections performed during the time period of TCRmax is equal to or greater than the threshold NCR_M and is equal to or less than the threshold NCR_H, the UE regards a current mobility state as Medium-mobility state.

In operation 1d-30, when the number of cell reselections performed during the time period of TCRmax is greater than the threshold NCR_H, the UE regards a current mobility state as High-mobility state. Hereinafter, 'a method of determining mobility based on the number of cell reselections' may indicate a method of determining mobility based on the number of cell reselections described with reference to operation 1d-05 to operation 1d-30 of FIG. 1D.

For the next-generation mobile communication system, 'relaxed Radio Resource Management (RRM) measurement' is discussed to reduce power consumption of a UE. The relaxed RRM measurement refers to a technology for reducing power consumption of a UE by applying a longer measurement period or reducing the number of cells or frequencies to be measured, when a certain condition is fulfilled. The primary reason why a UE measures a cell in a cellular mobile communication system is to support mobility of the UE. That is, in the cellular mobile communication system, a plurality of cells segment a region to be serviced and provide a service to UEs. Therefore, when a moving UE approaches a different cell, there is a need that a cell to provide a service needs to be switched in an optimal time point from a current serving cell to the cell to which the UE approaches. The optimal time point when a cell to provide a service is changed may be determined by a UE based on a result of measuring a serving cell and neighboring cells. Therefore, a measurement operation performed by the UE has to fulfill preset requirements to guarantee mobility performance.

The relaxed RRM measurement may lower the preset requirements to guarantee mobility performance. Therefore, it is necessary for the relaxed RRM measurement to be configured only provided that it does not degrade mobility performance. For example, when a moving speed of a UE is fast, if a cell measurement period is increased, a result of the cell measurement may not be timely obtained such that a cell reselection time point may be delayed. That is, mobility performance may deteriorate.

According to an embodiment of the disclosure, as a condition by which mobility performance is not degraded, a case where a UE does not move or moves in a slow speed may be considered, and whether the UE does not move or moves in a slow speed may be determined based on a mobility state. That is, in an embodiment of the disclosure, a mobility state may be used as a condition for configuring not only scaling but also the relaxed RRM measurement. Also, in an embodiment of the disclosure, a method of compensating a legacy mobility state or considering a beam switching count is provided.

Figure 1E:
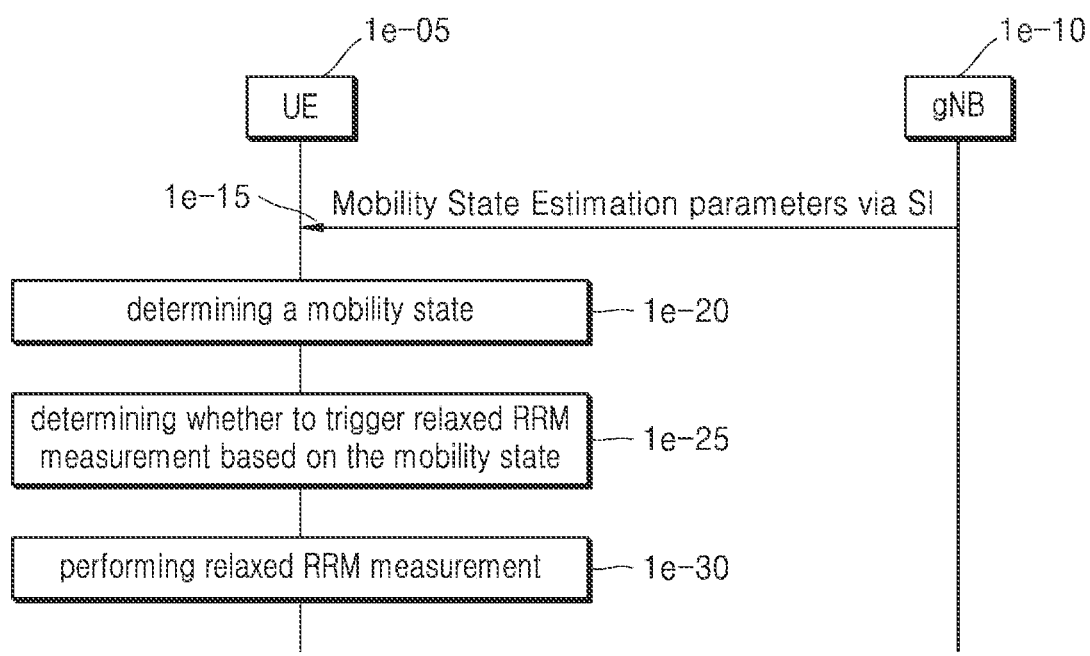
FIG. 1E is a flowchart of a procedure in which a UE performs relaxed radio resource management (RRM) measurement, according to an embodiment of the disclosure.

FIG. 1E is a flowchart of a procedure in which a UE performs relaxed RRM measurement, according to an embodiment of the disclosure.

Referring to FIG. 1E, a UE 1e-05 receives, from a gNB 1e-10, system information including configuration parameters required to determine a mobility state (operation 1e-15). The configuration parameters may include TCRmax, NCR_H, NCR_M, and TCRmaxHyst. Also, the system information may include a configuration parameter related to the relaxed RRM measurement. The configuration parameter related to the relaxed RRM measurement may include at least one of s-RelaxedIntraSearchP and s-RelaxedIntraSearchQ used to determine whether to perform relaxed RRM measurement in an intra-frequency and s-RelaxedInterSearchP or s-RelaxedInterSearchQ used to determine whether to perform relaxed RRM measurement in an inter-frequency. s-RelaxedIntraSearchP and s-RelaxedInterSearchP are RSRP-based thresholds, and s-RelaxedIntraSearchQ and s-RelaxedInterSearchQ are RSRQ-based thresholds.

The UE 1e-05 may determine one mobility state according to a preset method of determining a mobility state (operation 1e-20). For example, the UE 1e-05 may determine one mobility state according to a method described in operations 1d-05 to 1d-30 in FIG. 1D.

The UE 1e-05 determines whether to perform relaxed RRM measurement, based on the parameters provided from the gNB 1e-10 and the mobility state derived in operation 1e-20 (operation 1e-25). For example, as in Table 2 below, the UE 1e-05 may determine a measurement state about cells on an intra-frequency, in consideration of a result of comparison between a QoS (i.e., Srxlev or Squal) of a serving cell and the thresholds described above and the mobility state derived in operation 1e-20. Relaxed RRM measurement with respect to an intra-frequency may be performed when at least one condition from among conditions below is fulfilled.

When Srxlev value is greater than s-IntraSearchP, Squal value is less than or equal to s-IntraSearchQ and is greater than s-RelaxedIntraSearchQ, and a mobility state is Normal-mobility state When Srxlev value is less than or equal to s-IntraSearchP and is greater than s-RelaxedIntraSearchP, Squal value is greater than s-IntraSearchQ, and a mobility state is Normal-mobility state When Srxlev value is less than or equal to s-IntraSearchP and is greater than s-RelaxedIntraSearchP, Squal value is less than or equal to s-IntraSearchQ and is greater than s-RelaxedIntraSearchQ, and a mobility state is Normal-mobility state Also, the UE 1e-05 may consider a mobility state so as to determine normal measurement state or no measurement state. For example, when Srxlev and Squal respectively exceed s-IntraSearchP and s-IntraSearchQ, the UE 1e-05 may determine a measurement state as no measurement state. However, according to an embodiment of the disclosure, even when Srxlev and Squal respectively exceed s-IntraSearchP and s-IntraSearchQ, the UE 1e-05 may determine a measurement state as a normal measurement state if a mobility state is a high-mobility state or a medium-mobility state.

TABLE 2

| Srxlev | Squal | Mobility state | Meas. state for intra-Freq |
|---|---|---|---|
| > s-IntraSearchP | > s-IntraSearchQ | Normal | No measurement state |
| > s-IntraSearchP | ≤ s-IntraSearchQ and > s-RelaxedIntraSearchQ | Normal | Relaxed measurement state |
| > s-IntraSearchP | ≤ s-RelaxedIntraSearchQ | Normal | Normal measurement state |
| ≤ s-IntraSearchP and > s-RelaxedIntraSearchP | > s-IntraSearchQ | Normal | Relaxed measurement state |
| ≤ s-IntraSearchP and > s-RelaxedIntraSearchP | ≤ s-IntraSearchQ and > s-Relaxed IntraSearchQ | Normal | Relaxed measurement state |
| ≤ s-IntraSearchP and > s-RelaxedIntraSearchP | ≤ s-RelaxedIntraSearchQ | Normal | Normal measurement state |
| ≤ s-IntraSearchP | > s-IntraSearchQ | Normal | Normal measurement state |
| ≤ s-IntraSearchP | ≤ s-IntraSearchQ and > s-RelaxedIntraSearchQ | Normal | Normal measurement state |
| ≤ s-IntraSearchP | ≤ s-RelaxedIntraSearchQ | Normal | Normal measurement state |
| > s-IntraSearchP | > s-IntraSearchQ | High or Medium | Normal measurement state |
| > s-IntraSearchP | ≤ s-IntraSearchQ and > s-RelaxedIntraSearchQ | High or Medium | Normal measurement state |

TABLE 2-continued

| Srxlev | Squal | Mobility state | Meas. state for intra-Freq |
|---|---|---|---|
| > s-IntraSearchP | ≤ s-RelaxedIntraSearchQ | High or Medium | Normal measurement state |
| ≤s-IntraSearchP and > s-RelaxedIntraSearchP | > s-IntraSearchQ | High or Medium | Normal measurement state |
| ≤s-IntraSearchP and > s-RelaxedIntraSearchP | ≤s-IntraSearchQ and > s-RelaxedIntraSearchQ | High or Medium | Normal measurement state |
| ≤s-IntraSearchP and > s-RelaxedIntraSearchP | ≤ s-RelaxedIntraSearchQ | High or Medium | Normal measurement state |
| ≤ s-IntraSearchP | > s-IntraSearchQ | High or Medium | Normal measurement state |
| ≤ s-IntraSearchP | ≤s-IntraSearchQ and > s-RelaxedIntraSearchQ | High or Medium | Normal measurement state |
| ≤ s-IntraSearchP | ≤ s-RelaxedIntraSearchQ | High or Medium | Normal measurement state |

Similar to what is described above, as in Table 3 below, the UE 1e-05 may determine a measurement state about cells on an inter-frequency with same or lower priority, in consideration of a result of comparison between a QoS (i.e., Srxlev or Squal) of a serving cell and the thresholds described above and the mobility state derived in operation 1e-20. Relaxed RRM measurement with respect to the inter-frequency with same or lower priority may be performed when at least one condition from among conditions below is fulfilled.

When Srxlev value is greater than s-NonIntraSearchP, Squal value is less than or equal to s-NonIntraSearchQ and is greater than s-RelaxedInterSearchQ, and a mobility state is Normal-mobility state When Srxlev value is less than or equal to s-NonIntraSearchP and is greater than s-RelaxedInterSearchP, Squal value is greater than s-NonIntraSearchQ, and a mobility state is Normal-mobility state When Srxlev value is less than or equal to s-NonIntraSearchP and is greater than s-RelaxedInterSearchP, Squal value is less than or equal to s-NonIntraSearchQ and is greater than s-RelaxedInterSearchQ, and a mobility state is Normal-mobility state However, according to an embodiment of the disclosure, with respect to a frequency with higher priority than a current serving cell, the UE 1e-05 may determine a measurement state as a normal measurement state and always perform measurement, regardless of the result of comparison between a QoS (i.e., Srxlev or Squal) of a serving cell and the thresholds described above and the mobility state derived in operation 1e-20.

TABLE 3

| Srxlev | Squal | Mobility state | Cell reselection priority | Measurement state for inter-Freq |
|---|---|---|---|---|
| > s-NonIntraSearchP | > s-NonIntraSearchQ | Normal | Equal or lower | No measurement state |
| > s-NonIntraSearchP | ≤s-NonIntraSearchQ and > s-RelaxedInterSearchQ | Normal | Equal or lower | Relaxed measurement state |
| > s-NonIntraSearchP | ≤ s-RelaxedInterSearchQ | Normal | Equal or lower | Normal measurement state |
| ≤s-NonIntraSearchP and > s-RelaxedInterSearchP | > s-NonIntraSearchQ | Normal | Equal or lower | Relaxed measurement state |
| ≤s-NonIntraSearchP and > s-Relaxed InterSearchP | ≤s-NonIntraSearchQ and > s-RelaxedInterSearchQ | Normal | Equal or lower | Relaxed measurement state |
| ≤s-NonIntraSearchP and > s-RelaxedInterSearchP | ≤ s-RelaxedInterSearchQ | Normal | Equal or lower | Normal measurement state |
| ≤ s-NonIntraSearchP | > s-NonIntraSearchQ | Normal | Equal or lower | Normal measurement state |
| ≤ s-NonIntraSearchP | ≤s-NonIntraSearchQ and > s-RelaxedInterSearchQ | Normal | Equal or lower | Normal measurement state |
| ≤ s-NonIntraSearchP | ≤ s-RelaxedInterSearchQ | Normal | Equal or lower | Normal measurement state |
| > s-NonIntraSearchP | > s-NonIntraSearchQ | High or Medium | Equal or lower | Normal measurement state |
| > s-NonIntraSearchP | ≤s-NonIntraSearchQ and > s-RelaxedInterSearchQ | High or Medium | Equal or lower | Normal measurement state |
| > s-NonIntraSearchP | ≤ s-RelaxedInterSearchQ | High or Medium | Equal or lower | Normal measurement state |
| ≤s-NonIntraSearchP and > s-RelaxedInterSearchP | > s-NonIntraSearchQ | High or Medium | Equal or lower | Normal measurement state |
| ≤s-NonIntraSearchP and > s-RelaxedInterSearchP | ≤s-NonIntraSearchQ and > s-RelaxedInterSearchQ | High or Medium | Equal or lower | Normal measurement state |
| ≤s-NonIntraSearchP and > s-RelaxedInterSearchP | ≤ s-RelaxedInterSearchQ | High or Medium | Equal or lower | Normal measurement state |
| ≤ s-NonIntraSearchP | > s-NonIntraSearchQ | High or Medium | Equal or lower | Normal measurement state |
| ≤ s-NonIntraSearchP | ≤s-NonIntraSearchQ and > s-RelaxedInterSearchQ | High or Medium | Equal or lower | Normal measurement state |
| ≤ s-NonIntraSearchP | ≤ s-RelaxedInterSearchQ | High or Medium | Equal or lower | Normal measurement state |
| > s-NonIntraSearchP | > s-NonIntraSearchQ | Normal | Higher | Normal measurement state |
| > s-NonIntraSearchP | ≤s-NonIntraSearchQ and > s-RelaxedInterSearchQ | Normal | Higher | Normal measurement state |
| > s-NonIntraSearchP | ≤ s-RelaxedInterSearchQ | Normal | Higher | Normal measurement state |
| ≤s-NonIntraSearchP and > s-RelaxedInterSearchP | > s-NonIntraSearchQ | Normal | Higher | Normal measurement state |

TABLE 3-continued

| Srxlev | Squal | Mobility state | Cell reselection priority | Measurement state for inter-Freq |
|---|---|---|---|---|
| ≤s-NonIntraSearchP and > s-RelaxedInterSearchP | ≤s-NonIntraSearchQ and > s-RelaxedInterSearchQ | Normal | Higher | Normal measurement state |
| ≤s-NonIntraSearchP and > s-RelaxedInterSearchP | ≤ s-RelaxedInterSearchQ | Normal | Higher | Normal measurement state |
| ≤ s-NonIntraSearchP | > s-NonIntraSearchQ | Normal | Higher | Normal measurement state |
| ≤ s-NonIntraSearchP | ≤s-NonIntraSearchQ and > s-RelaxedInterSearchQ | Normal | Higher | Normal measurement state |
| ≤ s-NonIntraSearchP | ≤ s-RelaxedInterSearchQ | Normal | Higher | Normal measurement state |
| > s-NonIntraSearchP | > s-NonIntraSearchQ | High or Medium | Higher | Normal measurement state |
| > s-NonIntraSearchP | ≤s-NonIntraSearchQ and > s-RelaxedInterSearchQ | High or Medium | Higher | Normal measurement state |
| > s-NonIntraSearchP | ≤ s-RelaxedInterSearchQ | High or Medium | Higher | Normal measurement state |
| ≤s-NonIntraSearchP and > s-RelaxedInterSearchP | > s-NonIntraSearchQ | High or Medium | Higher | Normal measurement state |
| ≤s-NonIntraSearchP and > s-RelaxedInterSearchP | ≤s-NonIntraSearchQ and > s-RelaxedInterSearchQ | High or Medium | Higher | Normal measurement state |
| ≤s-NonIntraSearchP and > s-RelaxedInterSearchP | ≤ s-RelaxedInterSearchQ | High or Medium | Higher | Normal measurement state |
| ≤ s-NonIntraSearchP | > s-NonIntraSearchQ | High or Medium | Higher | Normal measurement state |
| ≤ s-NonIntraSearchP | ≤s-NonIntraSearchQ and > s-RelaxedInterSearchQ | High or Medium | Higher | Normal measurement state |
| ≤ s-NonIntraSearchP | ≤ s-RelaxedInterSearchQ | High or Medium | Higher | Normal measurement state |

In operation 1e-25, when the UE 1e-05 determines to perform relaxed RRM measurement, the UE 1e-05 performs a relaxed RRM measurement operation (operation 1e-30). That is, in order to reduce UE power consumption, the UE 1e-05 may apply a longer measurement period to neighboring cells or may decrease the number of cells or frequencies to be measured.

Figure 1F:
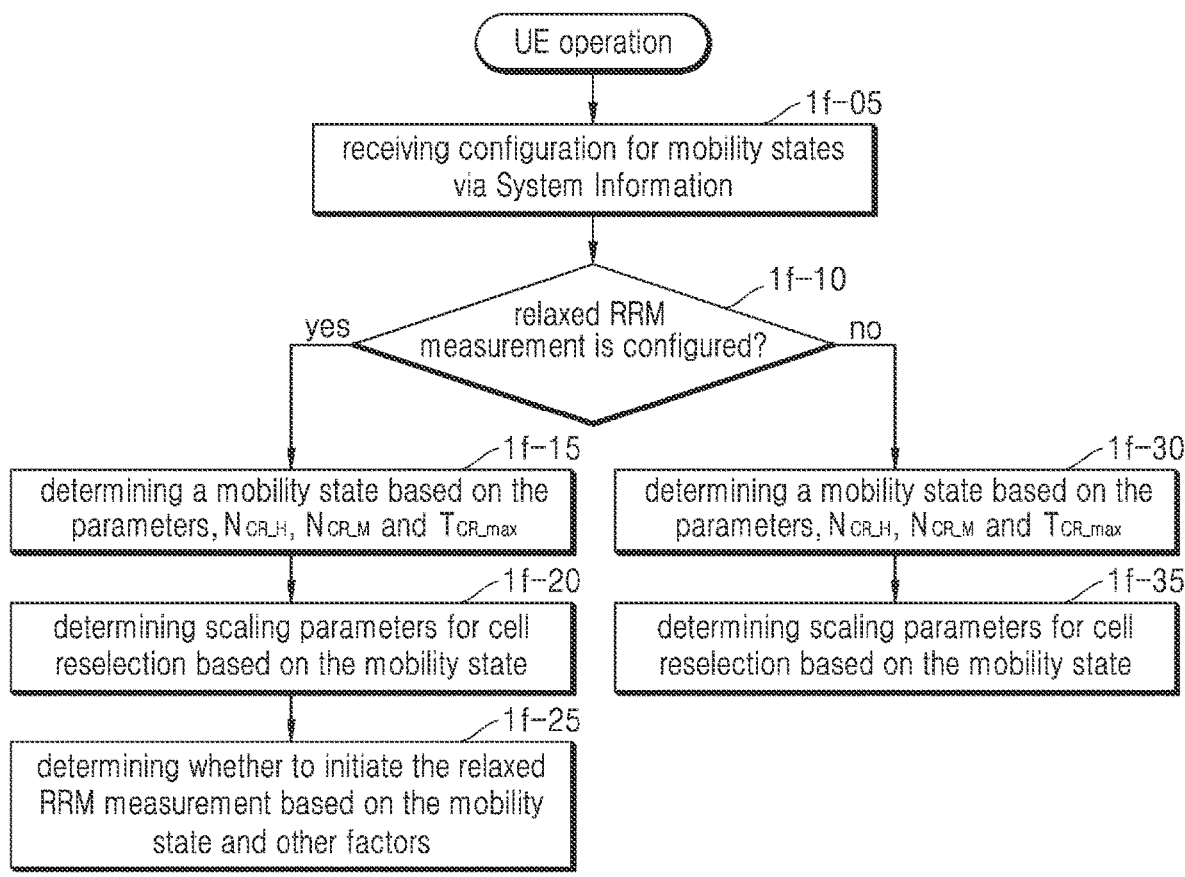
FIG. 1F is a flowchart of UE operations of determining relaxed RRM measurement according to a first embodiment of the disclosure.

FIG. 1F is a flowchart of UE operations of determining relaxed RRM measurement according to a first embodiment of the disclosure.

According to the first embodiment of the disclosure, a UE may determine a mobility state by applying a same NCR_M so as to determine scaling and measurement state.

Referring to FIG. 1F, in operation 1f-05, the UE may receive Mobility State Estimation (MSE)-related configuration parameters, cell reselection configuration parameters, and one indicator, via system information broadcast from a BS. The MSE-related configuration parameters may include TCRmax, NCR_H, NCR_M, and TCRmaxHyst. The cell reselection configuration parameters may include at least one of s-IntraSearchP, s-IntraSearchQ, s-NonIntraSearchP, s-NonIntraSearchQ, s-RelaxedIntraSearchP, s-RelaxedIntraSearchQ, s-RelaxedInterSearchP, or s-RelaxedInterSearchQ.

The indicator received via the system information broadcast from the BS indicates whether a derived mobility state is to be used as a condition for triggering relaxed RRM measurement. Also, whether cell reselection configuration parameters related to the relaxed RRM measurement are to be provided via the system information may indicate whether the derived mobility state is to be used as the condition for triggering relaxed RRM measurement. For example, if the cell reselection configuration parameters related to the relaxed RRM measurement are provided via the system information, the UE may use the derived mobility state as the condition for triggering relaxed RRM measurement.

In operation 1f-10 of FIG. 1F, the UE may determine whether the relaxed RRM measurement is configured, based on the configuration information received in operation 1f-05.

In operation 1f-15 of FIG. 1F, when it is determined that the relaxed RRM measurement is configured, the UE may determine a mobility state by using the MSE-related configuration parameters.

In operation 1f-20 of FIG. 1F, the UE may derive scaling parameters by using the determined mobility state. The derived scaling parameters may be used to scale cell reselection parameters.

In operation 1f-25 of FIG. 1F, the UE may determine whether to perform the relaxed RRM measurement, by using cell reselection configuration parameters and the derived mobility state. That is, the UE may determine one measurement state.

In operation 1f-30 of FIG. 1F, when it is determined that the relaxed RRM measurement is not configured, the UE may determine a mobility state by using the MSE-related configuration parameters.

In operation 1f-35 of FIG. 1F, the UE may derive scaling parameters by using the determined mobility state. The derived scaling parameters may be used to scale cell reselection parameters.

FIG. 1G is a flowchart of UE operations of determining relaxed RRM measurement according to a second embodiment of the disclosure.

According to the second embodiment of the disclosure, a UE may determine a mobility state by applying a separate NCR_M (e.g., NCR_M2) other than NCR_M being used to perform scaling for determining a measurement state. For scaling, the UE may determine the derived mobility state by applying a legacy NCR_M. The legacy NCR_M is a value used to determine scaling, and NCR_M2 that is a new value proposed in an embodiment of the disclosure may be a value used only to determine a mobility state, not to be used in determining scaling.

Referring to FIG. 1G, in operation 1g-05, the UE may receive MSE-related configuration parameters, cell reselection configuration parameters, and one indicator, via system information broadcast from a BS. The MSE-related configuration parameters may include TCRmax, NCR_H, NCR_M, NCR_M2, and TCRmaxHyst. NCR_M2 is used to determine a mobility state used to determine whether to trigger relaxed RRM measurement. For example, if the number of cell reselections performed during a time period of TCRmax (or new configuration value) is less than NCR_M2, the UE may regard the mobility state as a mobility state capable of triggering the relaxed RRM measurement. The cell reselection configuration parameters may include at least one of s-IntraSearchP, s-IntraSearchQ, s-NonIntraSearchP, s-NonIntraSearchQ, s-RelaxedIntraSearchP, s-RelaxedIntraSearchQ, s-RelaxedInterSearchP, or s-RelaxedInterSearchQ.

The indicator received via the system information broadcast from the BS indicates whether a derived mobility state is to be used as a condition for triggering relaxed RRM measurement. Also, whether cell reselection configuration parameters related to the relaxed RRM measurement or the separate NCR_M2 parameter is to be provided via the system information may indicate whether the derived mobility state is to be used as the condition for triggering relaxed RRM measurement. For example, if the cell reselection configuration parameters related to the relaxed RRM measurement or the separate NCR_M2 parameter is provided via the system information, the UE may use the derived mobility state as the condition for triggering relaxed RRM measurement. Also, when the separate NCR_M2 parameter is provided via the system information, the UE may use the derived mobility state as a condition for triggering the relaxed RRM measurement. The mobility state determined in a case where the separate NCR_M2 parameter is provided via the system information may be regarded as a new mobility state being distinguished from a normal-mobility state determined by using a NCR_M2 parameter.

In operation 1g-10, the UE may determine whether the relaxed RRM measurement is configured, based on the configuration information received in operation 1g-05.

In operation 1g-15, when it is determined that the relaxed RRM measurement is configured, the UE may determine a first mobility state by using the MSE-related configuration parameters. Here, NCR_M2 may be excluded.

In operation 1g-20, the UE may derive scaling parameters by using the determined first mobility state. The derived scaling parameters may be used to scale cell re selection parameters.

In operation 1g-25, the UE may determine a second mobility state by using the MSE-related configuration parameters. Here, instead of NCR_M, NCR_M2 may be used.

In operation 1g-30, the UE may determine whether to perform the relaxed RRM measurement, by using cell reselection configuration parameters and the determined second mobility state. That is, the UE may determine one measurement state.

In operation 1g-35, when it is determined that the relaxed RRM measurement is not configured, the UE may determine a first mobility state by using the MSE-related configuration parameters. Here, NCR_M2 may be excluded.

In operation 1g-40, the UE may derive scaling parameters by using the determined first mobility state. The derived scaling parameters may be used to scale cell reselection parameters.

Figure 1H:
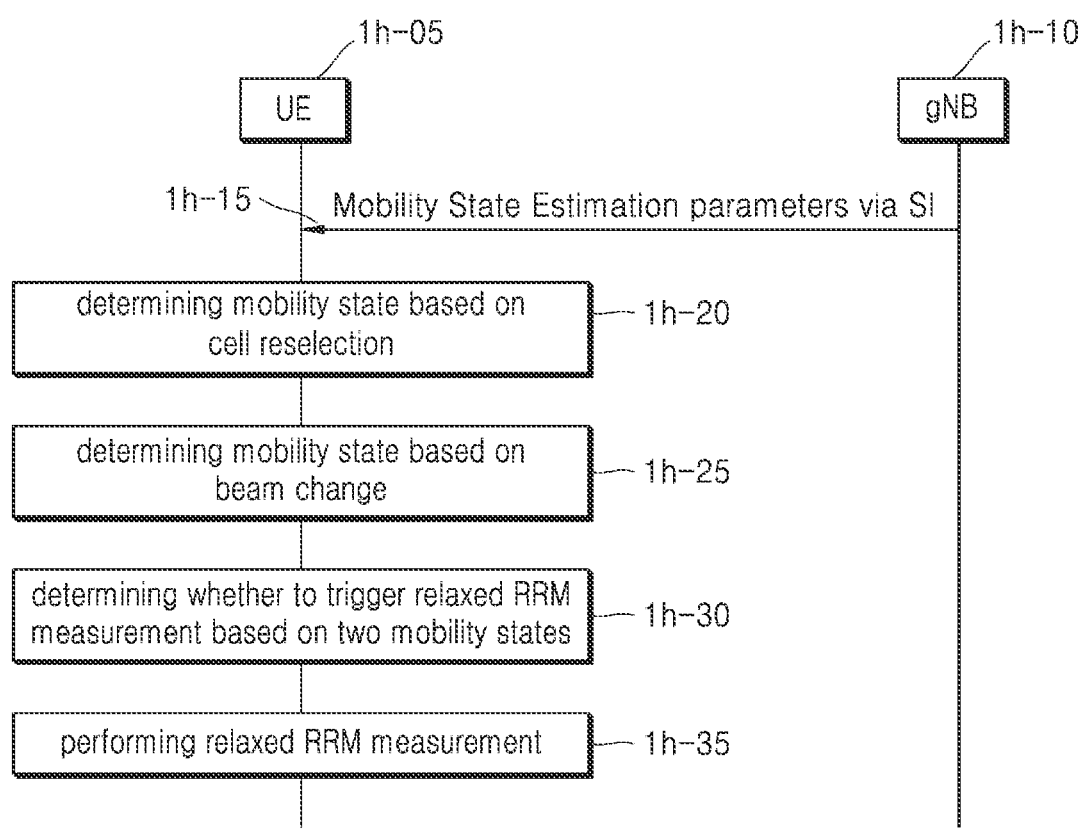
FIG. 1H is a flowchart of a procedure in which a UE performs relaxed RRM measurement, in consideration of the number of beam switching, according to an embodiment of the disclosure.

FIG. 1H is a flowchart of a procedure in which a UE performs relaxed RRM measurement, in consideration of the number of beam switching, according to an embodiment of the disclosure.

According to an MSE procedure, one mobility state is determined based on the number of cell reselections occurring during a preset time period. However, due to various variables such as a radius of cell, a moving path of a UE, or the like, it may be rather insufficient to represent mobility of the UE based on a mobility state determined based on the number of cell reselections. Therefore, an embodiment of the disclosure proposes a method of using a mobility state determined based on the number of beam switching, along with MSE based on the number of cell reselections. For example, the UE may determine one mobility state based on the number of beam switching during a preset time period. Also, the UE may determine one mobility state based on both a mobility state based on the number of cell reselections and a mobility state based on the number of beam switching.

Referring to FIG. 1H, a UE 1h-05 receives, from a gNB 1h-10, system information including configuration parameters required to determine a mobility state (operation 1h-15). The configuration parameters may include TCRmax, NCR_H, NCR_M, and TCRmaxHyst. Also, the system information may include NBC_x and TBC that are configuration parameters required to determine a mobility state based on the number of beam switching. NBC_x is one parameter set and may be plural in number according to the number of mobility states based on the number of beam switching. For example, if three mobile states based on the number of beam switching exist, NBC_1 and NBC_2 may be required, and a mobility state based on the number of beam switching may be derived according to a method below.

If the number of beam switching performed during a time period of TBC is less than a threshold NBC_1, the mobility state based on the number of beam switching is regarded as Normal-mobility state.

If the number of beam switching performed during a time period of TBC is equal to or greater than a threshold NBC_1 and is equal to or less than a threshold NBC_2, the mobility state based on the number of beam switching is regarded as Medium-mobility state.

If the number of beam switching performed during a time period of TBC is greater than a threshold NBC_2, the mobility state based on the number of beam switching is regarded as High-mobility state.

Beam switching indicates a change in a synchronization signal block (SSB) (or an SSB index) that monitors paging in a same cell. In a case where the UE 1h-05 counts the number of beam switching in a particular cell and then reselects a different cell, a counted number of beam switching may be reset.

The system information may include a configuration parameter related to the relaxed RRM measurement. The configuration parameter related to the relaxed RRM measurement may include s-RelaxedIntraSearchP and s-RelaxedIntraSearchQ used to determine whether to perform relaxed RRM measurement in an intra-frequency and s-RelaxedInterSearchP and s-RelaxedInterSearchQ used to determine whether to perform relaxed RRM measurement in an inter-frequency. s-RelaxedIntraSearchP and s-RelaxedInterSearchP are RSRP-based thresholds, and s-RelaxedIntraSearchQ and s-RelaxedInterSearchQ are RSRQ-based thresholds.

The UE 1h-05 may determine a first mobility state according to a method of determining a mobility state based on the number of cell reselections (operation 1h-20).

The UE 1h-05 may determine a second mobility state according to a method of determining a mobility state based on the number of beam switching (operation 1h-25).

The UE 1h-05 determines whether to perform relaxed RRM measurement, based on the parameters provided from the gNB, the first mobility state determined based on the number of cell reselections, and the second mobility state determined based on the number of cell beam switching (operation 1e-30). For example, when both mobility states indicate a lowest state (normal-mobility state), and a result of comparison between a QoS (i.e., Srxlev or Squal) of a serving cell and thresholds is fulfilled, the relaxed RRM measurement may be triggered. Also, at least one of the first mobility state and the second mobility state may be considered by the UE 1h-05 to determine normal measurement state or no measurement state. When it is determined to perform the relaxed RRM measurement in operation 1h-25, the UE 1h-05 may perform the relaxed RRM measurement (operation 1h-35). Hereinafter, 'a method of determining mobility based on the number of beam switching' may indicate a method of determining mobility based on the number of beam switching described with reference to operation 1h-05 to operation 1h-35 of FIG. 1H.

FIG. 1I is a flowchart of operations of determining, by a UE, relaxed RRM measurement by considering the number of beam switching, according to an embodiment of the disclosure.

Referring to FIG. 1I, in operation 1i-05, the UE receives, from a BS, system information including configuration parameters required to determine a mobility state.

In operation 1i-10, the UE may obtain configuration parameters required to determine a mobility state based on the number of beam switching. The configuration parameters required to determine a mobility state based on the number of beam switching may be included in the system information received in operation 1i-05.

In operation 1i-15, the UE may determine a first mobility state, according to MSE configuration parameters based on the number of cell reselections and a method of determining a mobility state based on the number of cell reselections, which are provided via system information.

In operation 1i-20, the UE may determine a second mobility state, according to MSE configuration parameters based on the number of beam switching and a method of determining a mobility state based on the number of beam switching.

In operation 1i-25, the UE may determine whether the determined two mobility states are all lowest mobility states.

In operation 1i-30, if both the two mobility states are not lowest mobility states, the UE may trigger normal measurement state or no measurement state, in consideration of conditions of a comparison between a QoS (i.e., Srxlev or Squal) of a serving cell and thresholds In operation 1i-35, if both the two mobility states are lowest mobility states, the UE may trigger normal measurement state or no measurement state, in consideration of conditions of a comparison between a QoS (i.e., Srxlev or Squal) of a serving cell and thresholds.

FIG. 1J is a flowchart of a case where a UE performs measurement for mobility, when the UE transitions from a connected state to an idle mode or an inactive mode with respect to a serving cell, according to an embodiment of the disclosure.

Referring to FIG. 1J, the UE may receive new system information in an idle mode, an inactive mode, or a connected mode. According to an embodiment of the disclosure, the system information (SIB) may include information below for cell selection/reselection.

Absolute priority values of frequencies to be measured
Received signal power thresholds of a serving cell which are required to determine a measurement state
RSRP and RSRQ received power thresholds for determining a Relaxed measurement state
Factors related to mobility state estimation
Measurement interval values to be applied to respective measurement states and a list of cells to be measured with respect to an intra-frequency
Measurement interval value and a cell to be measured on an intra-frequency, which are to be applied in a Relaxed measurement state
Information of a frequency group to be measured, which is to be applied to each of measurement states with respect to an inter-frequency and an inter-RAT
Information of a frequency to be measured, which is to be applied in a relaxed measurement state
Measurement interval and a list of cells to be measured per each frequency, which are to be applied to each of measurement states with respect to an inter-frequency and an inter-RAT
Measurement interval value and a list of cells to be measured per each frequency to be measured, which are to be applied in a relaxed measurement state A plurality of pieces of information for cell selection/reselection described above may be included in different SIBs and transmitted or may be included together in a particular SIB based on types or characteristics of the information and transmitted. For example, the received signal power thresholds of a serving cell which are required to determine a measurement state, and the factors related to mobility state estimation may be included together in SIB2 1j-05 and transmitted. Also, the measurement interval values to be applied to respective measurement states and a list of cells to be measured with respect to an intra-frequency may be may be included in SIB3 1j-10 and transmitted. Also, the measurement interval and a list of cells to be measured per each frequency, which are to be applied to each of measurement states with respect to an inter-frequency and an inter-RAT, and the information of a frequency group to be measured, which is to be applied to each of measurement states with respect to an inter-frequency and an inter-RAT may be included together in SIB4 1j-15 and transmitted.

As the aforedescribed plurality of pieces of information for cell selection/reselection are included in an SIB and transmitted, the UE may all receive them in inactive/idle/connected states, and always considers a most-recent value for operations.

After the UE receives the aforedescribed plurality of pieces of information for cell selection/reselection, when the UE receives, from a serving cell, a request to transition from a connected mode to an idle mode or an inactive mode, an RRC dedicated message 1j-20 for the request of the transition may include an absolute priority value with respect to a measurement frequency, and a value of a timer and then may be transmitted. During the received timer, the UE may all discard frequency priority values received in a previous connected mode and replace with the frequency absolute priority value, or may replace only a frequency priority value which overlaps with the received frequency absolute priority value, with the received frequency absolute priority value. When the UE receives the RRC dedicated message 1j-20, the UE may transition to an IDLE mode or an INACTIVE mode in operation 1j-25.

In operation 1j-30, if the UE supports a relaxed measurement state, and if information to determine a relaxed measurement state, a measurement interval to be used in a relaxed measurement state, a cell to be measured, and information of a frequency to be measured are transmitted via an SIB from a cell on which the UE currently camps, the UE may perform an operation of the relaxed measurement state. For example, the UE may operate in a measurement state of one of three measurement states of no measurement state, relaxed measurement state or normal measurement state, with respect to a preset frequency.

The UE in an inactive mode or an idle mode may determine a measurement state, in consideration of power of a serving cell, an mobility state measurement value, and relative priority of a camping frequency according to given frequency absolute priority. Also, the UE may independently determine a measurement state with respect to an intra-frequency, and an inter-frequency & an inter-RAT.

According to an embodiment of the disclosure, in order to determine a measurement state, operations below may be performed. From among values being delivered via an SIB, s-IntraSearchP1, s-IntraSearchQ1, s-IntraSearchP2 and s-IntraSearchQ2 values may be delivered as the received signal power thresholds of a serving cell which are required to determine a measurement state. When the thresholds are delivered, the UE measures RSRP received power of the serving cell and RSRQ received power of the serving cell, and if the RSRP received power of the serving cell is between s-IntraSearchP1 and s-IntraSearchP2, the RSRQ received power of the serving cell is between s-IntraSearchQ1 and s-IntraSearchQ2, and a mobility state is normal, the UE may determine a relaxed measurement state for a measurement state with respect to an intra-frequency.

According to an embodiment of the disclosure, in a signal perspective, separately from existing s-IntraSearchP and s-IntraSearchQ values used to determine no measurement state, s-IntraSearchP1, s-IntraSearchQ1, s-IntraSearchP2, and s-IntraSearchQ2 may be transmitted to the UE. When the UE supports a relaxed measurement state, the UE may consider s-IntraSearchP1, s-IntraSearchQ1, s-IntraSearchP2, and s-IntraSearchQ2, in determination of a measurement state. Also, existing s-IntraSearchP and s-IntraSearchQ values used to determine no measurement state may be transmitted to the UE, and s-IntraSearchP* and s-IntraSearchQ* may be additionally transmitted to the UE. The UE may configure a smaller value among s-IntraSearchP and s-IntraSearchP* as s-IntraSearchP1 and a greater value among them as s-IntraSearchP2, may configure a smaller value among s-IntraSearchQ and s-IntraSearchQ* as s-IntraSearchQ1 and a greater value among them as s-IntraSearchQ2, and then may use them to determine a relaxed measurement state. According to an embodiment of the disclosure, s-IntraSearchP* and s-IntraSearchQ* are thresholds related to relaxed measurement, and s-IntraSearchP* may be less than or equal to s-IntraSearchP, and s-IntraSearchQ* may be less than or equal to s-IntraSearchQ. Also, with respect to s-nonIntraSearchP, Q (i.e., with respect to a case of nonIntra-frequency), descriptions with reference to s-IntraSearchP, Q may be applied based on inference.

When a measurement state is determined as a relaxed measurement state, the UE may perform a relaxed measurement operation on each target, i.e., a serving cell, an intra-frequency, and an inter frequency & inter-RAT. Hereinafter, a case in which each measurement target (a serving cell, an intra-frequency, and an inter frequency & inter-RAT) is determined as a relaxed measurement state will now be described.

According to an embodiment of the disclosure, with respect to a measurement interval, the UE may perform measurement on a serving cell at every discontinuous reception (DRX) cycle. The UE may perform measurement on an intra-frequency at every N*DRX cycle. Also, the UE may perform measurement, at every L*DRX cycle, on inter-frequency & inter-RAT frequencies with higher priority than a frequency of a current camping cell. Here, a value of N may be broadcast via SIB3. A value of L may be broadcast via SIB4. N and L may have a same value. Alternatively, when a value of N is transmitted via one SIB3, the value of N may be used for both an intra-frequency and an inter-frequency.

Also, the UE may perform measurement, at every M*DRX cycle, on a frequency with priority being equal to or lower than priority of a frequency of the current camping cell. M may be designated for each of frequencies, and may be transmitted via SIB4. N and M may have a relation of N<M.

According to an embodiment of the disclosure, a network may configure separate values of N and L, according to DRX cycles configured for the UE. That is, separate values of N and L may be configured for a long DRX cycle and a short DRX cycle. The network may separately configure, in an SIB or a dedicated RRC message, determination thresholds for a long DRX cycle and a short DRX cycle. The UE may determine whether its DRX cycle is short or long, based on the configured thresholds, and may apply values of N and L to its DRX cycle according to a result of the determination and may apply the values of N and L as a measurement interval. For example, when its DRX cycle is long, the UE may use values of N and L corresponding to the long DRX cycle, and on the contrary, when its DRX cycle is short, the UE may use values of N and L corresponding to the short DRX cycle.

According to an embodiment of the disclosure, when a measurement state is a no measurement state (i.e., a first measurement state), the UE may perform measurement on an inter-frequency with higher priority than priority of a frequency of a camping cell, at every L*DRX cycle as a second measurement state (i.e., a relaxed measurement state).

According to an embodiment of the disclosure, with respect to a cell to be measured, when a black list is given, the UE in a legacy normal measurement state may measure all cells excluding a blacklisted cell from among cells being detected in measurement.

The UE in a relaxed measurement state may determine a cell to be measured, based on a white list. That is, the UE may measure only a cell on the white list. A white list with respect to an intra-frequency may be transmitted via SIB3. A white list to be applied to an inter-frequency & an inter-RAT may exist for each frequency to be measured, and the white list may be transmitted via SIB4. Also, the network may signal K that is a maximum number of cells to be measured for each of frequencies of an intra-frequency or an inter-frequency. The UE may determine top K cells with high received signal power as cells to be measured, except for a blacklisted cell, from among cells detected for each of frequencies.

According to an embodiment of the disclosure, a white list may be transmitted via SIB4 even in a first measurement state (i.e., no measurement state). A white list may be transmitted with respect to frequencies with higher priority than priority of a serving frequency of a current camping cell from among inter-frequencies, and upon reception of the white list, the UE in a first measurement state may measure cells included in the white list on the frequencies with higher priority than priority of the serving frequency.

According to an embodiment of the disclosure, in a second measurement state (i.e., a relaxed measurement state), a white list may not be transmitted but blacklist 2 may be transmitted. The UE may measure all cells on a frequency to be measured, except for a cell corresponding to blacklist 2. Also, in a third measurement state (i.e., a normal measurement state), the UE may perform measurement on all detected cells except for cells corresponding to a sum-set of a cell included in blacklist 2 and a cell corresponding to legacy black list known for normal measurement. Blacklist 2 may be transmitted for an intra-frequency cell via SIB3, and with respect to an inter-frequency, Blacklist 2 may be transmitted for each frequency to be measured, via SIB4.

According to an embodiment of the disclosure, with respect to a frequency to be measured, in a legacy normal measurement state, carriers to be measured are broadcast via SIB4, regardless of priorities, and the UE may measure all carriers the UE supports. On the other hand, in a relaxed measurement state, the UE measure carriers that fulfill at least one condition among conditions below, from among carriers the UE supports and of which cell reselection priorities are higher than a serving frequency.

n highest priority carriers
  alternatively, if a particular frequency range (FR) is broadcast via SIB4, carriers that belong to the particular FR.
  > For example, SIB4 may indicate FR1 or FR2 as information of carriers to be measured in relaxed measurement, and all carriers that belong to a corresponding FR are measured
  alternatively, carriers that belong to a particular carrier set (hereinafter, carrier group 1) in SIB4

Also, the UE measure carriers that fulfill at least one condition among conditions below, from among carriers the UE supports and of which cell reselection priorities are equal to or lower than a serving frequency.

m highest priority carriers, where n>m.
  Alternatively, carriers that belong to a particular carrier set (hereinafter, carrier group 2) in SIB4
  Carriers for which SS block based RRM measurement timing configuration (SMTC) is indicated in SIB4
  It is because, if SMTC is not indicated, the UE consumes more power in measurement
  Carriers for which deriveSSB-IndexFromCell is indicated as TRUE in SIB4
  It is because, if it is indicated as False, the UE consumes more power in measurement According to an embodiment of the disclosure, when the network indicates a list of a particular carrier in SIB4, regardless of priority, the UE may measure the indicated carrier.

According to an embodiment of the disclosure, the network may indicate a particular priority value in SIB4, and the UE may measure, even in a relaxed measurement state, a carrier with higher reselection priority than the indicated particular priority value.

According to an embodiment of the disclosure, as information about a carrier to be measured in a first measurement state, with respect to inter-frequencies with higher priority than priority of a serving frequency of a current camping cell of the UE, the network may transmit, via SIB4, a carrier set equal to carrier group 1 known in a second measurement state, or may transmit a carrier set (hereinafter, carrier group 0) different from carrier group 1. No matter what an indicated carrier set is carrier group 1 or carrier group 0, if a measurement state of the UE corresponds to the first measurement state, the UE may measure a frequency corresponding to the carrier set so as to search for a cell reselection target.

The UE enters a relaxed measurement state:
According to an embodiment of the disclosure, the UE may camp on a new cell (Cell 2) from an idle or inactive state in operation 1j-35, and when a serving cell power threshold to define a relaxed measurement state is broadcast from the new cell via SIB2 1j-40, and the UE supports the relaxed measurement state, the UE may determine its measurement state as the relaxed measurement state, based on the serving cell power threshold, a mobility state estimation value, and relative priority of a camping frequency, and may transition to the relaxed measurement state.

Also, when a serving cell power threshold to define a relaxed measurement state is broadcast from a serving cell via SIB2 1j-40, and the UE supports the relaxed measurement state, the UE in a connected mode may determine its measurement state as the relaxed measurement state, based on the serving cell power threshold, a mobility state estimation value, and relative priority of a camping frequency, and may transition to the relaxed measurement state. In operation 1j-45, the UE may operate in one measurement state among two measurement states of a normal measurement state or a relaxed measurement state with respect to a preset frequency, based on the serving cell power threshold.

According to an embodiment of the disclosure, the UE may transmit, as UE capability information, indication indicating whether the UE supports a relaxed measurement state, to the BS. Upon reception of the indication, the BS may transmit a factor to determine a relaxed measurement state or factors to identify a measurement operation in the relaxed measurement state, to the UE via an SIB or an RRC dedicated message.

Figure 1K:
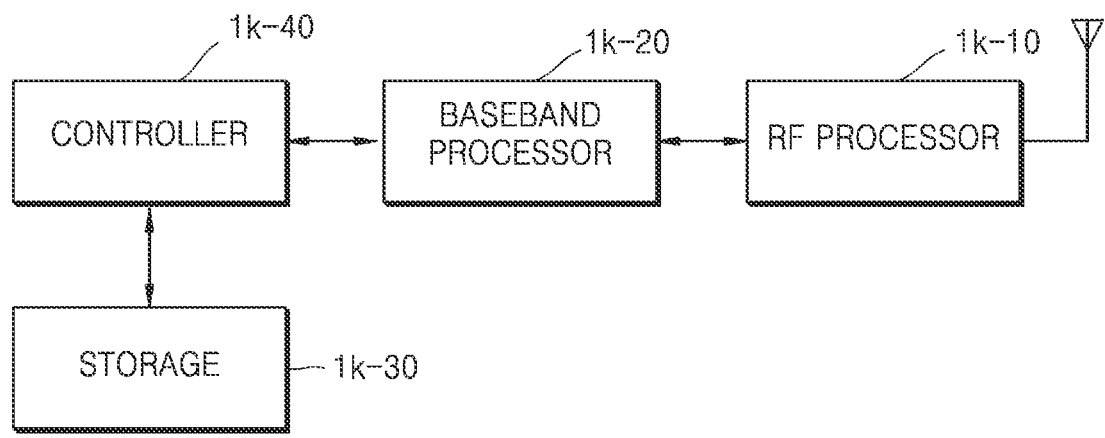
FIG. 1K is a block diagram of an internal configuration of a UE, according to an embodiment of the disclosure.

FIG. 1K is a block diagram of an internal configuration of a UE, according to an embodiment of the disclosure.

Referring to FIG. 1K, the UE may include a radio frequency (RF) processor 1k-10, a baseband processor 1k-20, a storage 1k-30, and a controller 1k-40. However, the internal configuration of the UE is not limited to the example above and may include more elements than the elements shown in FIG. 1K or may include less elements than the shown elements. The RF processor 1k-10 performs functions for transmitting and receiving signals through radio channels, e.g., band conversion and amplification of the signals. That is, the RF processor 1k-10 may up-convert a baseband signal provided from the baseband processor 1k-20, into an RF band signal and then may transmit the RF band signal through an antenna, and may down-convert an RF band signal received through the antenna, into a baseband signal. For example, the RF processor 1k-10 may include a transmit filter, a receive filter, an amplifier, a mixer, an oscillator, a digital-to-analog convertor (DAC), an analog-to-digital convertor (ADC), or the like. Although only one antenna is illustrated in drawing, the UE may include a plurality of antennas. Also, the RF processor 1k-10 may include a plurality of RF chains. In addition, the RF processor 1k-10 may perform beamforming. For beamforming, the RF processor 1k-10 may adjust phases and intensities of signals to be transmitted or received through a plurality of antennas or antenna elements. Also, the RF processor 1k-10 may perform a MIMO operation and may receive a plurality of layers in the MIMO operation. The RF processor 1k-10 may perform received beam sweeping by appropriately configuring a plurality of antennas or antenna elements, or may adjust a direction and a beam width of a received beam to coordinate with a transmit beam, under the control of the controller.

The baseband processor 1k-20 converts between a baseband signal and a bit string according to physical layer specifications of a system. For example, for data transmission, the baseband processor 1k-20 may generate complex symbols by encoding and modulating a transmit bit string. For data reception, the baseband processor 1k-20 may reconstruct a received bit string by demodulating and decoding a baseband signal provided from the RF processor 1k-10. For example, according to an OFDM scheme, for data transmission, the baseband processor 1k-20 may generate complex symbols by encoding and modulating a transmit bit string, may map the complex symbols to subcarriers, and then may configure OFDM symbols by performing inverse fast Fourier transform (IFFT) and cyclic prefix (CP) insertion. For data reception, the baseband processor 1k-20 may segment a baseband signal provided from the RF processor 1k-10, into OFDM symbol units, may reconstruct signals mapped to subcarriers by performing fast Fourier transform (FFT), and then may reconstruct a received bit string by demodulating and decoding the signals.

The baseband processor 1k-20 and the RF processor 1k-10 transmit and receive signals as described above. Accordingly, the baseband processor 1k-20 and the RF processor 1k-10 may also be called a transmitter, a receiver, a transceiver, or a communicator. Furthermore, at least one of the baseband processor 1k-20 and the RF processor 1k-10 may include a plurality of communication modules to support a plurality of different radio access technologies. At least one of the baseband processor 1k-20 and the RF processor 1k-10 may include different communication modules to process signals of different frequency bands. For example, the different radio access technologies may include an LTE network, an NR network, or the like. The different frequency bands may include a super-high frequency (SHF) (e.g., 2.1 GHz, 1 GHz) band and a millimeter wave (mmWave) (e.g., 60 GHz) band. The UE may transmit and receive signals to and from the BS by using the baseband processor 1k-20 and the RF processor 1k-10, and the signals may include control information and data.

The storage 1k-30 stores basic programs, application programs, and data, e.g., configuration information, for operations of the UE. The storage 1k-30 provides the stored data upon request by the controller 1k-40. The storage 1k-30 may include any or a combination of storage media such as read-only memory (ROM), random access memory (RAM), a hard disk, a compact disc (CD)-ROM, and a digital versatile disc (DVD). Also, the storage 1k-30 may include a plurality of memories.

The controller 1k-40 controls overall operations of the UE. For example, the controller 1k-40 transmits and receives signals via the baseband processor 1k-20 and the RF processor 1k-10. Also, the controller 1k-40 records and reads data on or from the storage 1k-30. To this end, the controller 1k-40 may include at least one processor. For example, the controller 1k-40 may include a communication processor (CP) for controlling communications and an application processor (AP) for controlling an upper layer such as an application program. Also, the controller 1k-40 may control the UE to perform the aforementioned method of performing a handover procedure. Also, at least one configuration in the UE may be implemented as one chip.

Figure 1L:
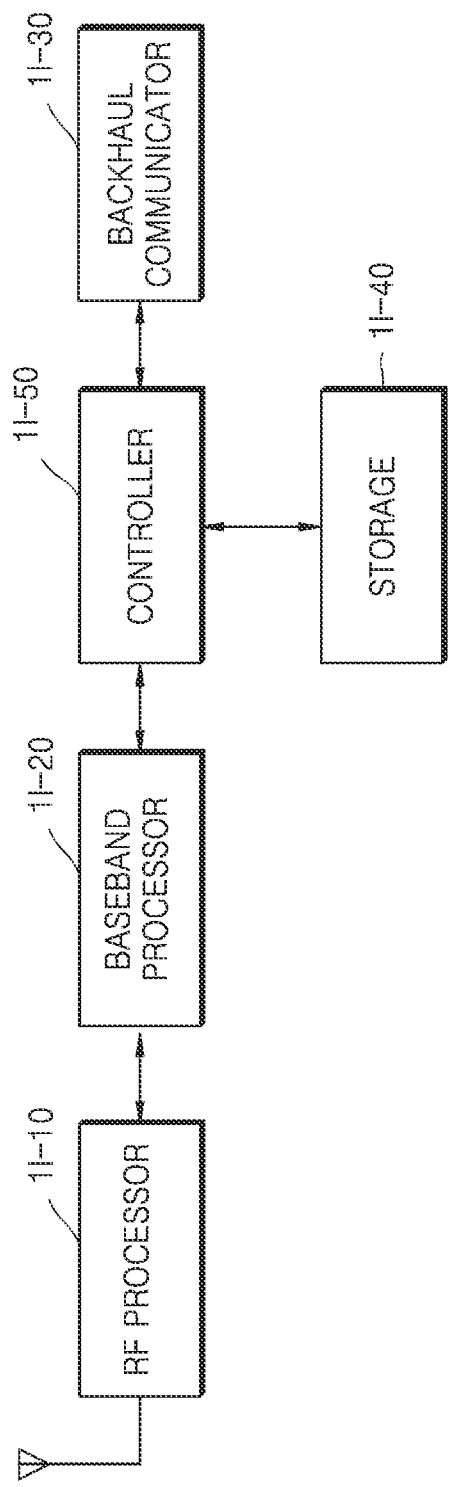
FIG. 1L is a block diagram of a configuration of a BS, according to an embodiment of the disclosure.

FIG. 1L is a block diagram of a configuration of a BS, according to an embodiment of the disclosure.

Referring to FIG. 1L, the BS (or a transmission reception point (TRP) or a radio node) may include a RF processor 1l-10, a baseband processor 1l-20, a backhaul communicator 1l-30, a storage 1l-40, and a controller 1l-50. However, the configuration of the BS is not limited to the example above and may include more elements than the elements shown in FIG. 1L or may include less elements than the shown elements.

The RF processor 1l-10 performs functions for transmitting and receiving signals through radio channels, e.g., band conversion and amplification of the signals. That is, the RF processor 1l-10 may up-convert a baseband signal provided from the baseband processor 1l-20, into an RF band signal and then may transmit the RF band signal through an antenna, and may down-convert an RF band signal received through the antenna, into a baseband signal. For example, the RF processor 1l-10 may include a transmit filter, a receive filter, an amplifier, a mixer, an oscillator, a DAC, an ADC, or the like. Although only one antenna is illustrated in drawing, a first access node may include a plurality of antennas. Also, the RF processor 1l-10 may include a plurality of RF chains. In addition, the RF processor 1l-10 may perform beamforming. For beamforming, the RF processor 1l-10 may adjust phases and intensities of signals to be transmitted or received through a plurality of antennas or antenna elements. The RF processor 1l-10 may perform a DL MIMO operation by transmitting one or more layers.

The baseband processor 1l-20 converts between a baseband signal and a bit string according to physical layer specifications of a first radio access technology. For example, for data transmission, the baseband processor 1l-20 may generate complex symbols by encoding and modulating a transmit bit string. For data reception, the baseband processor 1l-20 may reconstruct a received bit string by demodulating and decoding a baseband signal provided from the RF processor 1l-10. For example, according to an OFDM scheme, for data transmission, the baseband processor 1l-20 may generate complex symbols by encoding and modulating a transmit bit string, may map the complex symbols to subcarriers, and then may configure OFDM symbols by performing IFFT and CP insertion. For data reception, the baseband processor 1l-20 may segment a baseband signal provided from the RF processor 1l-10, into OFDM symbol units, may reconstruct signals mapped to subcarriers by performing FFT, and then may reconstruct a received bit string by demodulating and decoding the signals. The baseband processor 1l-20 and the RF processor 1l-10 transmit and receive signals as described above. Accordingly, the baseband processor 1l-20 and the RF processor 1l-10 may also be called a transmitter, a receiver, a transceiver, a communicator, or a wireless communicator.

The BS may transmit and receive signals to and from the UE by using the baseband processor 1l-20 and the RF processor 1l-10, and the signals may include control information and data.

The backhaul communicator 1l-30 provides an interface for performing communication with other nodes in a network. That is, the backhaul communicator 1l-30 converts a bit string into a physical signal, the bit string being transmitted from the BS to another node, e.g., an auxiliary BS, a core network, etc., and converts a physical signal into a bit string, the physical signal being received from the other node.

The storage 1l-40 stores basic programs, application programs, and data, e.g., configuration information, for operations of a primary BS. In particular, the storage 1l-40 may store information about a bearer allocated to an accessing UE, a measurement result reported from the accessing UE, and the like. Also, the storage 1l-40 may store information that is a reference as to whether to provide or stop multi-connection to a UE. The storage 1l-40 provides the stored data upon request by the controller 1l-50. The storage 1l-40 may include any or a combination of storage media such as ROM, RAM, a hard disk, a CD-ROM, and a DVD. Also, the storage 1l-40 may include a plurality of memories.

The controller 1l-50 controls overall operations of the BS. For example, the controller 1l-50 transmits and receives signals via the baseband processor 1l-20 and the RF processor 1l-10, or the backhaul communicator 1l-30. Also, the controller 1*l*-50 records and reads data on or from the storage 1*l*-40. To this end, the controller 1*l*-50 may include at least one processor. Also, the controller 1*l*-50 may control the BS to perform the aforementioned method of performing an RRC connection resume procedure. Also, at least one configuration in the BS may be implemented as one chip.

Hereinafter, a failure reporting method and apparatus for handover in a wireless communication system will now be described.

Figure 2A:
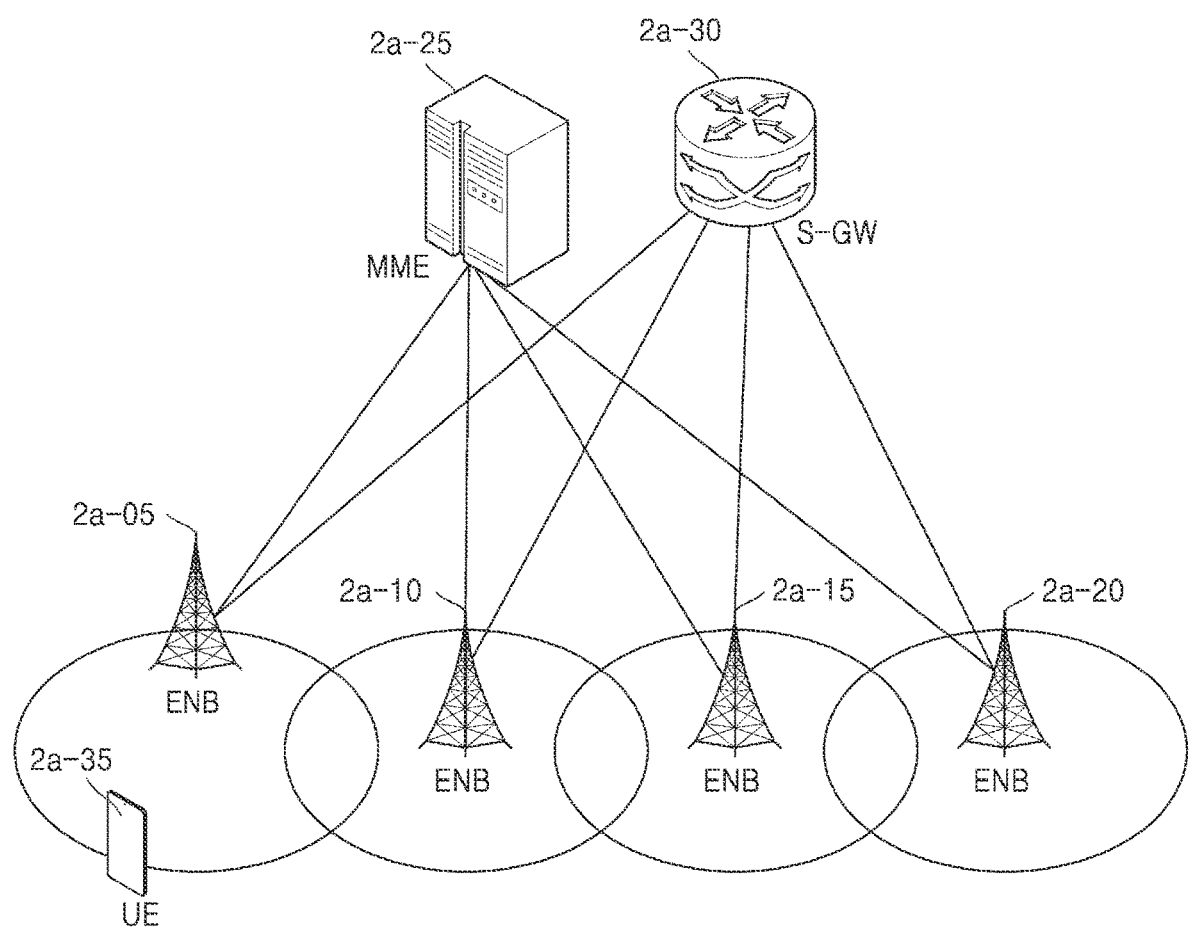
FIG. 2A is a diagram illustrating a configuration of a long term evolution (LTE) system, according to an embodiment of the disclosure.

FIG. 2A is a diagram illustrating a configuration of an LTE system, according to an embodiment of the disclosure.

Referring to FIG. 2A, a radio access network (RAN) of the LTE system includes a plurality of evolved nodes B (eNBs) (or nodes B or base stations) 2*a*-05, 2*a*-10, 2*a*-15, and 2*a*-20, a mobility management entity (MME) 2*a*-25, and a serving-gateway (S-GW) 2*a*-30. A UE (or a terminal) 2*a*-35 may access an external network via the eNB 2*a*-05, 2*a*-10, 2*a*-15, or 2*a*-20 and the S-GW 2*a*-30.

In FIG. 2A, the eNB 2*a*-05, 2*a*-10, 2*a*-15, or 2*a*-20 may correspond to a legacy node B of a universal mobile telecommunications system (UMTS). The eNB is connected to the UE 2*a*-35 through wireless channels and performs complex functions compared to the legacy node B. All user traffic data including real-time services such as voice over Internet protocol (VoIP) may be serviced through shared channels in the LTE system. Therefore, an entity for collating status information, e.g., buffer status information, available transmission power status information, and channel state information, of UEs and performing scheduling may be required and the eNB 2*a*-05, 2*a*-10, 2*a*-15, or 2*a*-20 may operate as such an entity. One eNB may generally control a plurality of cells. For example, the LTE system may use radio access technology such as OFDM at a bandwidth of 20 MHz to achieve a data rate of 100 Mbps. Also, adaptive modulation & coding (AMC) may be used to determine a modulation scheme and a channel coding rate in accordance with a channel state of the UE. The S-GW 2*a*-30 is an entity for providing data bearers. The S-GW 2*a*-30 may add or release the data bearers, under the control of the MME 2*a*-25. The MME 2*a*-25 is an entity for performing a mobility management function and various control functions on the UE and may be connected to the plurality of eNBs.

Figure 2B:
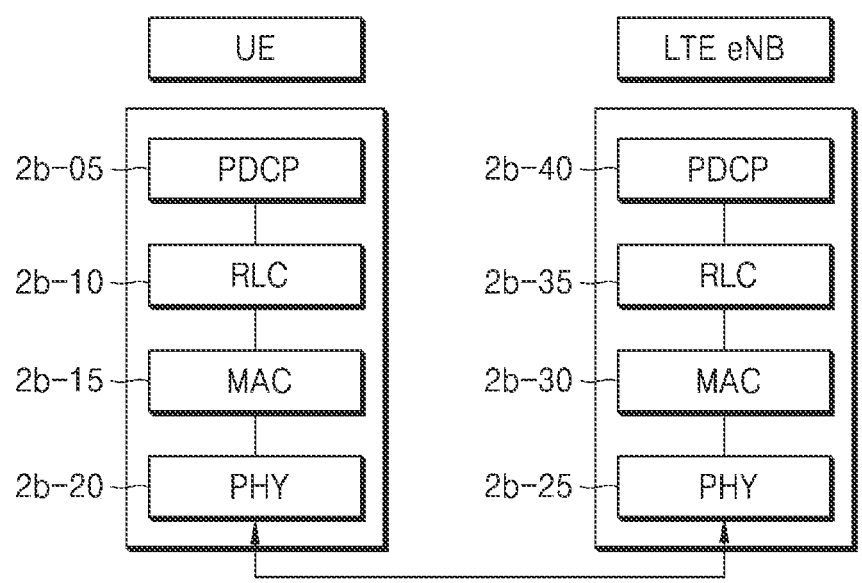
FIG. 2B is a diagram illustrating a radio protocol architecture of an LTE system, according to an embodiment of the disclosure.

FIG. 2B is a diagram illustrating a radio protocol architecture of an LTE system, according to an embodiment of the disclosure.

Referring to FIG. 2B, the radio protocol architecture of the LTE system may include PDCP layers 2*b*-05 and 2*b*-40, for Radio Link Control (RLC) layers 2*b*-10 and 2*b*-35, and MAC layers 2*b*-15 and 2*b*-30 respectively for a UE and an eNB. The PDCP layer 2*b*-05 or 2*b*-40 may perform, for example, IP header compression/decompression. Main functions of the PDCP layer may be summarized as shown below. However, the functions thereof are not limited thereto.

Header compression and decompression: robust header compression (ROHC) only
Transfer of user data
In-sequence delivery of upper layer Packet Data Units (PDUs) at PDCP re-establishment procedure for RLC Acknowledge Mode (AM)
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC layer 2*b*-10 or 2*b*-35 may perform an automatic repeat request (ARQ) operation by reconfiguring PDCP PDUs to appropriate sizes. Main functions of the RLC layer 2*b*-10 or 2*b*-35 may be summarized as shown below. However, the functions thereof are not limited thereto.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 2*b*-15 or 2*b*-30 may be connected to a plurality of RLC layers configured for one UE and may multiplex RLC PDUs into a MAC PDU and may demultiplex the RLC PDUs from the MAC PDU. Main functions of the MAC layer 2*b*-15 or 2*b*-30 may be summarized as shown below. However, the functions thereof are not limited thereto.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical (PHY) layer 2*b*-20 or 2*b*-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 2C:
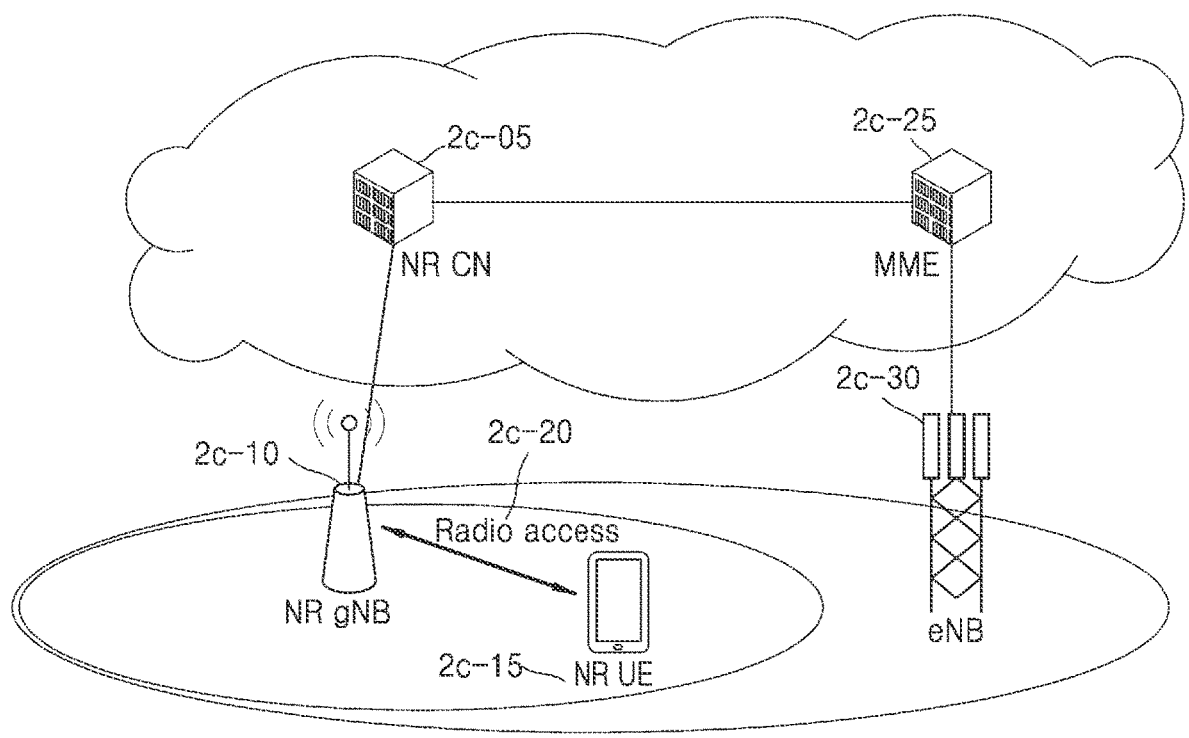
FIG. 2C is a diagram illustrating a next-generation mobile communication system, according to an embodiment of the disclosure.

FIG. 2C is a diagram illustrating a next-generation mobile communication system, according to an embodiment of the disclosure.

Referring to FIG. 2C, as illustrated, a radio access network of the next-generation mobile communication system (hereinafter, referred to as the NR or 5G) communication system) includes a new radio node B (NR gNB, NR NB, or gNB) 2*c*-10 and a new radio core network (NR CN) 2*c*-05. A NR UE (or terminal) 2*c*-15 may access an external network via the NR gNB 2*c*-10 and the NR CN 2*c*-05.

In FIG. 2C, the NR gNB 2*c*-10 may correspond to an eNB of an LTE system. The NR gNB 2*c*-10 may be connected to the NR UE 2*c*-15 through radio channels and may provide superior services compared to a legacy node B. All user traffic data may be serviced through shared channels in the NR or 5G mobile communication system. Therefore, an entity for collating buffer status information of UEs, available transmission power status information, and channel state information and performing scheduling may be required and the NR gNB 2c-10 may operate as such an entity. One NR gNB 2c-10 may generally control a plurality of cells. The NR or 5G communication system may have a bandwidth greater than the maximum bandwidth of the current LTE system so as to achieve an ultra-high data rate, compared to the current LTE system. Also, OFDM may be used as a radio access technology and a beamforming technology may be additionally used. Also, AMC may be used to determine a modulation scheme and a channel coding rate in accordance with a channel state of the UE. The NR CN 2c-05 may perform functions such as mobility support, bearer configuration, and QoS configuration. The NR CN 2c-05 is an entity for performing a mobility management function and various control functions on the NR UE and is connected to a plurality of base stations. The NR or 5G mobile communication system may cooperate with the LTE system, and the NR CN 2c-05 may be connected to an MME 2c-25 through a network interface. The MME 2c-25 may be connected to a legacy eNB 2c-30.

Figure 2D:
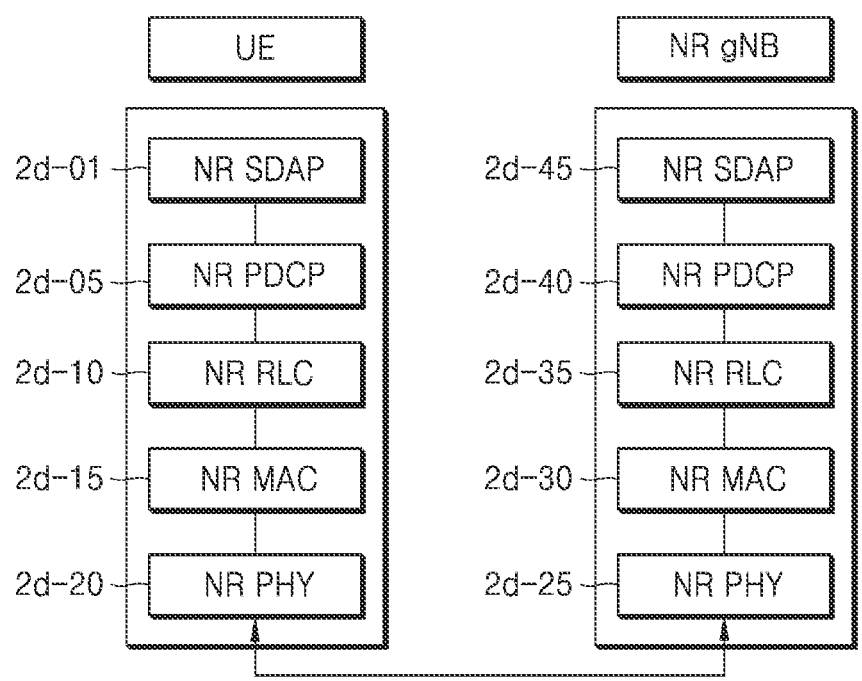
FIG. 2D is a diagram illustrating a radio protocol architecture of a next-generation mobile communication system, according to an embodiment of the disclosure.

FIG. 2D is a diagram illustrating a radio protocol architecture of a NR or 5G mobile communication system, according to an embodiment of the disclosure.

Referring to FIG. 2D, the radio protocol architecture of the NR or 5G mobile communication system may include NR Service Data Adaptation Protocol (SDAP) layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

Main functions of the NR SDAP layer 2d-01 or 2d-45 may include some of the following functions. However, the functions thereof are not limited thereto.
transfer of user plane data
mapping between a QoS flow and a DRB for both DL and UL
marking QoS flow ID in both DL and UL packets
reflective QoS flow to DRB mapping for the UL SDAP PDUs.

With regard to a SDAP layer, information about whether to use a header of the SDAP layer or to use functions of the SDAP layer may be configured for the UE by using a RRC message per PDCP layer, per bearer, or per logical channel. When the SDAP header of the SDAP layer is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for appropriately supporting a service.

Main functions of the NR PDCP layer 2d-05 or 2d-40 may include some of the following functions. However, the functions thereof are not limited thereto.
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above descriptions, the reordering function of the NR PDCP layer may indicate a function of reordering PDCP PDUs received from a lower layer, on a PDCP sequence number (SN) basis. The reordering function of the NR PDCP layer may include at least one of a function of delivering the reordered data to an upper layer in order, a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 2d-10 or 2d-35 may include some of the following functions. However, the functions thereof are not limited thereto.
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layer indicates a function of delivering RLC SDUs received from a lower layer to an upper layer in order. When a plurality of RLC SDUs segmented from one RLC SDU are received, the in-sequence delivery function of the NR RLC layer may include at least one of a function of reassembling the RLC SDUs and delivering the reassembled RLC SDU.

The in-sequence delivery function of the NR RLC layer may include at least one of a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs. The in-sequence delivery function of the NR RLC layer may include a function of delivering only RLC SDUs prior to a missing RLC SDU, to an upper layer in order when the missing RLC SDU exists. The in-sequence delivery function of the NR RLC layer may include a function of delivering all RLC SDUs received before a timer starts, to an upper layer in order although a missing RLC SDU exists when a certain timer expires. The in-sequence delivery function of the NR RLC layer may include a function of delivering all RLC SDUs received so far, to an upper layer in order although a missing RLC SDU exists when a certain timer expires.

The NR RLC layer may process the RLC PDUs in order of reception and deliver the RLC PDUs to the NR PDCP layer regardless of SNs (out-of-sequence delivery).

When the NR RLC layer receives a segment, the NR RLC layer may reassemble the segment with other segments stored in a buffer or subsequently received, into a whole RLC PDU and may deliver the RLC PDU to the NR PDCP layer.

The NR RLC layer may not have a concatenation function, and the concatenation function may be performed by the NR MAC layer or be replaced with a multiplexing function of the NR MAC layer.

In the descriptions above, the out-of-sequence delivery function of the NR RLC layer may include a function of directly delivering RLC SDUs received from a lower layer to an upper layer out of order. The out-of-sequence delivery function of the NR RLC layer may include a function of reassembling a plurality of RLC SDUs segmented from one RLC SDU and delivering the reassembled RLC SDU when the segmented RLC SDUs are received. The out-of-sequence delivery function of the NR RLC layer may include a function of recording missing RLC PDUs by storing RLC SNs or PDCP SNs of received RLC PDUs and reordering the received RLC PDUs.

The NR MAC layer 2d-15 or 2d-30 may be connected to a plurality of NR RLC layers configured for one UE, and main functions of the NR MAC layer may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 2d-20 or 2d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 2E:
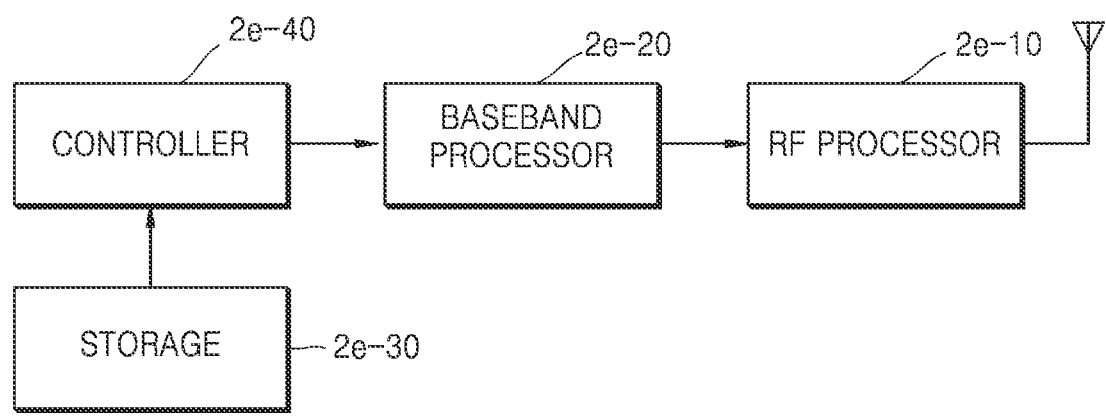
FIG. 2E is a block diagram of a configuration of a UE, according to an embodiment of the disclosure.

FIG. 2E is a block diagram of a configuration of a UE, according to an embodiment of the disclosure.

Referring to FIG. 2E, the UE may include a RF processor 2e-10, a baseband processor 2e-20, a storage 2e-30, and a controller 2e-40.

The RF processor 2e-10 may perform functions for transmitting and receiving signals through radio channels, e.g., band conversion and amplification of the signals. That is, the RF processor 2e-10 may up-convert a baseband signal provided from the baseband processor 2e-20, into an RF band signal and then may transmit the RF band signal through an antenna, and may down-convert an RF band signal received through the antenna, into a baseband signal. For example, the RF processor 2e-10 may include a transmit filter, a receive filter, an amplifier, a mixer, an oscillator, a DAC, an ADC, or the like. However, this is merely an example, and a configuration of the RF processor 2e-10 is not limited to the aforedescribed example. Although only one antenna is illustrated in FIG. 2E, the UE may include a plurality of antennas. Also, the RF processor 2e-10 may include a plurality of RF chains. In addition, the RF processor 2e-10 may perform beamforming. For beamforming, the RF processor 2e-10 may adjust phases and intensities of signals to be transmitted or received through a plurality of antennas or antenna elements. Also, the RF processor 2e-10 may perform a MIMO operation and may receive a plurality of layers in the MIMO operation.

The baseband processor 2e-20 may convert between a baseband signal and a bit string according to physical layer specifications of a system. For example, for data transmission, the baseband processor 2e-20 may generate complex symbols by encoding and modulating a transmit bit string. For data reception, the baseband processor 2e-20 may reconstruct a received bit string by demodulating and decoding a baseband signal provided from the RF processor 2e-10. For example, according to an OFDM scheme, for data transmission, the baseband processor 2e-20 may generate complex symbols by encoding and modulating a transmit bit string, may map the complex symbols to subcarriers, and then may configure OFDM symbols by performing IFFT and CP insertion. For data reception, the baseband processor 2e-20 may segment a baseband signal provided from the RF processor 2e-10, into OFDM symbol units, may reconstruct signals mapped to subcarriers by performing FFT, and then may reconstruct a received bit string by demodulating and decoding the signals.

The baseband processor 2e-20 and the RF processor 2e-10 may transmit and receive signals as described above. Accordingly, the baseband processor 2e-20 and the RF processor 2e-10 may also be called a transmitter, a receiver, a transceiver, or a communicator. Furthermore, at least one of the baseband processor 2e-20 and the RF processor 2e-10 may include a plurality of communication modules to support a plurality of different radio access technologies. At least one of the baseband processor 2e-20 and the RF processor 2e-10 may include different communication modules to process signals of different frequency bands. For example, the different radio access technologies may include a wireless LAN (for example: IEEE 802.11), a cellular network (for example: LTE), or the like. The different frequency bands may include a SHF (e.g., 2.NRHz, NRhz) band and an mmWave (e.g., 60 GHz) band. The UE may transmit and receive signals to and from the BS by using the baseband processor 2e-20 and the RF processor 2e-10. Here, the signals may include control information and data.

The storage 2e-30 may store basic programs, application programs, and data, e.g., configuration information, for operations of the UE. In particular, the storage 2e-30 may store information about an access node that performs wireless communication by using a radio access technology. The storage 2e-30 provides the stored data upon request by the controller 2e-40. The storage 2e-30 may include any or a combination of storage media such as ROM, RAM, a hard disk, a CD-ROM, and a DVD. Also, the storage 2e-30 may include a plurality of memories.

The controller 2e-40 may control overall operations of the UE. For example, the controller 2e-40 may transmit and receive signals via the baseband processor 2e-20 and the RF processor 2e-10. Also, the controller 2e-40 may record and read data on or from the storage 2e-40. To this end, the controller 2e-40 may include at least one processor. For example, the controller 2e-40 may include a CP for controlling communications and an AP for controlling an upper layer such as an application program. Also, the controller 2e-40 may control the UE to perform beam-based handover. Also, at least one configuration in the UE may be implemented as one chip.

Figure 2F:
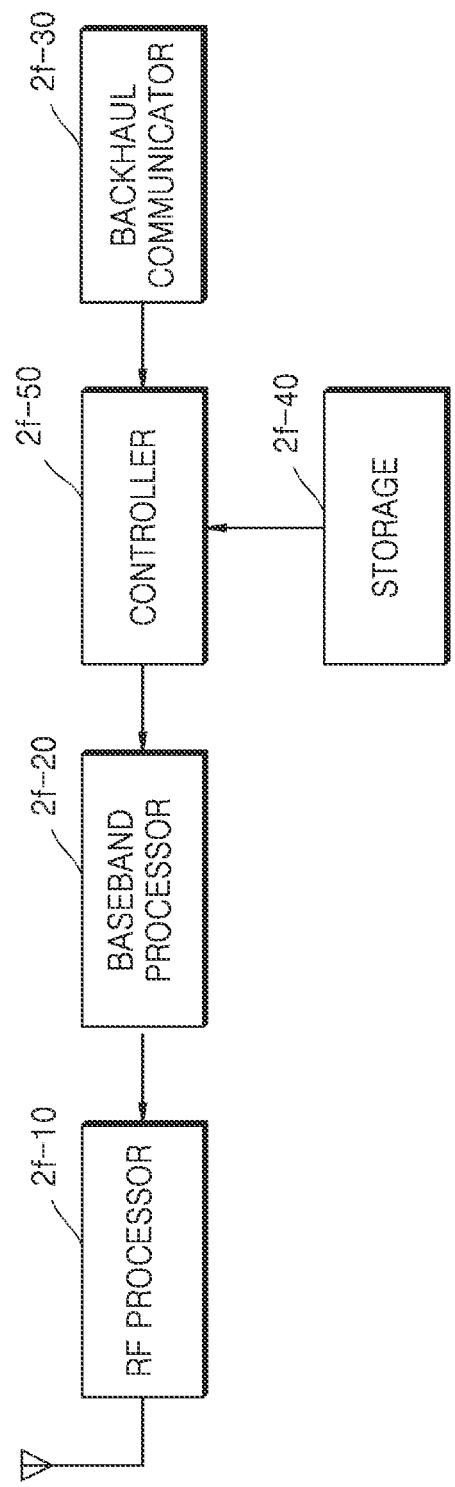
FIG. 2F is a block diagram of a configuration of a BS, according to an embodiment of the disclosure.

FIG. 2F is a block diagram of a configuration of a BS, according to an embodiment of the disclosure.

Referring to FIG. 2F, the BS may include a RF processor 2f-10, a baseband processor 2f-20, a backhaul communicator 2f-30, a storage 2f-40, and a controller 2f-50.

The RF processor 2f-10 may perform functions for transmitting and receiving signals through radio channels, e.g., band conversion and amplification of the signals. That is, the RF processor 2f-10 may up-convert a baseband signal provided from the baseband processor 2f-20, into an RF band signal and then may transmit the RF band signal through an antenna, and may down-convert an RF band signal received through the antenna, into a baseband signal. For example, the RF processor 2f-10 may include a transmit filter, a receive filter, an amplifier, a mixer, an oscillator, a DAC, an ADC, or the like. However, this is merely an example, and the configuration of the RF processor 2f-10 is not limited to the aforedescribed example. Although only one antenna is illustrated in the embodiment of FIG. 2F, the BS may include a plurality of antennas. Also, the RF processor 2*f*-10 may include a plurality of RF chains. In addition, the RF processor 2*f*-10 may perform beamforming. For beamforming, the RF processor 2*f*-10 may adjust phases and intensities of signals to be transmitted or received through a plurality of antennas or antenna elements. The RF processor 2*f*-10 may perform a MIMO operation by transmitting one or more layers.

The baseband processor 2*f*-20 may convert between a baseband signal and a bit string according to physical layer specifications of a radio access technology. For example, for data transmission, the baseband processor 2*f*-20 may generate complex symbols by encoding and modulating a transmit bit string. For data reception, the baseband processor 2*f*-20 may reconstruct a received bit string by demodulating and decoding a baseband signal provided from the RF processor 2*f*-10. For example, when the radio access technology follows an OFDM scheme, for data transmission, the baseband processor 2*f*-20 may generate complex symbols by encoding and modulating a transmit bit string, may map the complex symbols to subcarriers, and then may configure OFDM symbols by performing IFFT and CP insertion. For data reception, the baseband processor 2*f*-20 may segment a baseband signal provided from the RF processor 2*f*-10, into OFDM symbol units, may reconstruct signals mapped to subcarriers by performing FFT, and then may reconstruct a received bit string by demodulating and decoding the signals.

The baseband processor 2*f*-20 and the RF processor 2*f*-10 transmit and receive signals as described above. Accordingly, the baseband processor 2*f*-20 and the RF processor 2*f*-10 may also be called a transmitter, a receiver, a transceiver, a communicator, or a wireless communicator.

The backhaul communicator 2*f*-30 may provide an interface for performing communication with other nodes in a network. That is, the backhaul communicator 2*f*-30 may convert a bit string into a physical signal, the bit string being transmitted from the BS to another node, e.g., an auxiliary BS, a core network, etc., and may convert a physical signal into a bit string, the physical signal being received from the other node.

The storage 2*f*-40 may store basic programs, application programs, and data, e.g., configuration information, for operations of the BS. In particular, the storage 2*f*-40 may store information about a bearer allocated to an accessing UE, a measurement result reported from the accessing UE, and the like. Also, the storage 2*f*-40 may store information that is a reference as to whether to provide or stop multi-connection to a UE. The storage 2*f*-40 may provide the stored data upon request by the controller 2*f*-50. The storage 2*f*-40 may include any or a combination of storage media such as ROM, RAM, a hard disk, a CD-ROM, and a DVD. Also, the storage 2*f*-40 may include a plurality of memories.

The controller 2*f*-50 may control overall operations of the BS. For example, the controller 2*f*-50 may transmit and receive signals via the baseband processor 2*f*-20 and the RF processor 2*f*-10, or the backhaul communicator 2*f*-30. Also, the controller 2*f*-50 may record and read data on or from the storage 2*f*-40. To this end, the controller 2*f*-50 may include at least one processor.

FIG. 2G is a flowchart of operations related to handover failure.

Figure 2H:
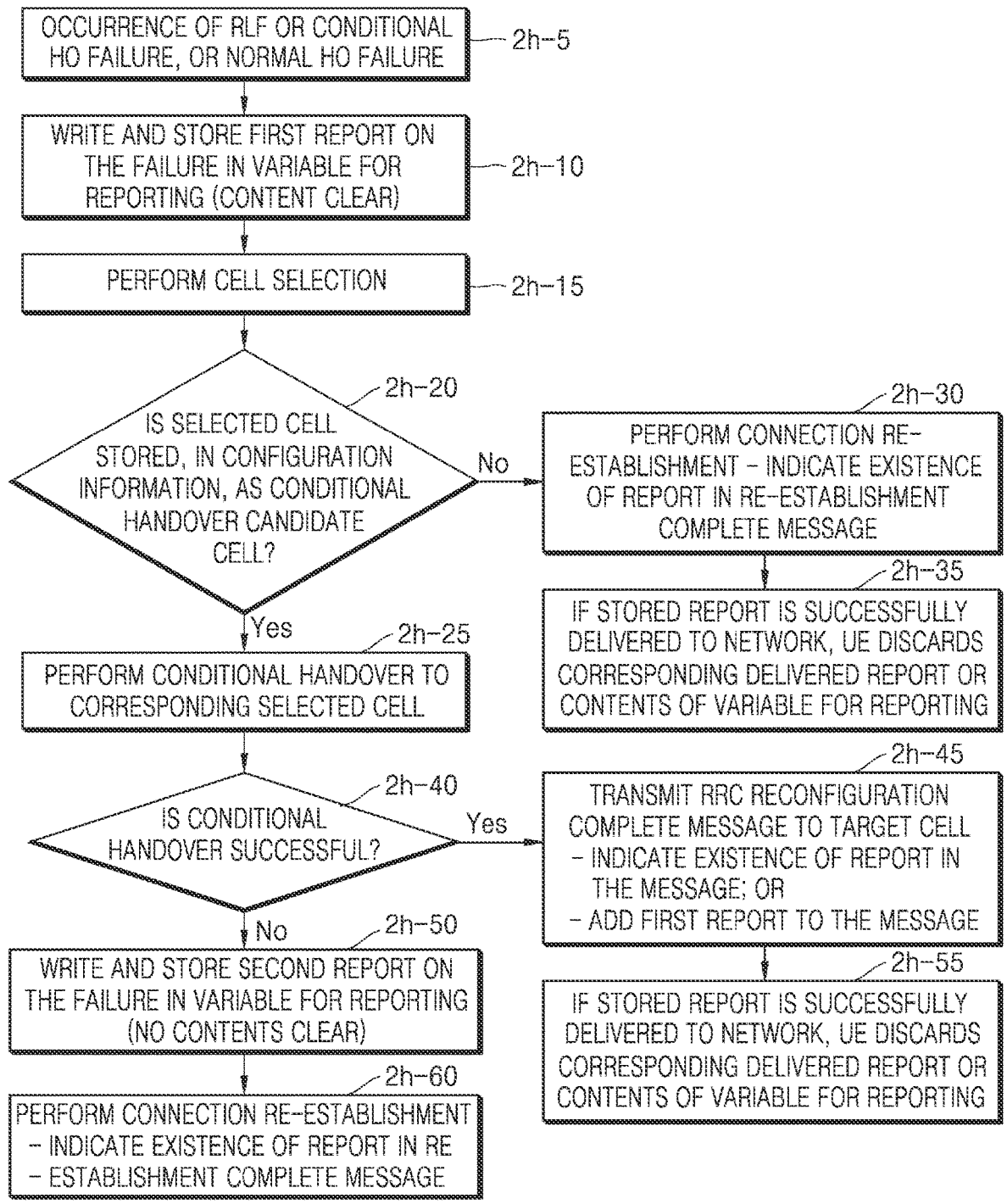
FIG. 2H is a flowchart of operations of a method by which a UE stores consecutive failure reports and transmits a stored failure report to a BS, according to an embodiment of the disclosure.

When the UE performs handover or a radio link failure (RLF) is declared by a serving cell, the UE may record a failure report on the failure in a storage of the UE. Also, the UE may perform RRC connection re-establishment due to the failure. In RRC connection re-establishment due to the failure, when a report reporting a failure is stored, the UE may transmit RRC connection re-establishmentComplete message including an indicator indicating existence of an RLF report. When the BS receives the indicator indicating existence of the RLF report, and determines that the BS requires the report, the BS may request, via UEInformationRequest message, the UE to transmit the RLF report. When the UE receives the UEInformationRequest message, the UE may transmit the RLF report to the BS via UEInformationResponse message, and when a lower layer confirms a successful delivery of the UEInformationResponse message, the UE may delete the RLF report from its internal memory. In the cases above, the indicator indicating existence of the RLF report may be included in at least one of messages below RRCConnectionSetupComplete,
RRCConnectionResumeComplete
RRCConnectionReconfigurationComplete
RRCConnectionReestablishmentComplete FIG. 2H is a flowchart of operations of a method by which a UE stores consecutive failure reports and transmits a stored failure report to a BS, according to an embodiment of the disclosure.

The UE in a connected state may have an RLF with a serving cell or may fail to perform handover to a different cell or may fail to perform conditional handover to a different cell (operation 2*h*-05). In this case, the UE may write and store a first report on the failure in a variable for failure reporting. In this case, the UE may clear variable contents that are previously stored (operation 2*h*-10). Also, the UE may perform cell reselection (operation 2*h*-15). In this case, the UE may determine whether a selected cell is stored, in configuration information, as a conditional handover candidate cell (operation 2*h*-20). If the selected cell is the candidate cell of conditional handover, the UE may apply the configuration and then may perform conditional handover to the selected cell (operation 2*h*-25). If the selected cell is not the candidate cell of conditional handover, the UE may perform an RRC connection re-establishment operation (operation 2*h*-30). In this case, re-establishment complete message being transmitted from the UE to a serving cell may indicate existence of a failure report (operation 2*h*-30). If the stored report is successfully delivered to the serving cell, the UE may discard the delivered report or contents of the variable for reporting (operation 2*h*-35). The UE may determine whether conditional handover to the selected cell is successful or not, in operation 2*h*-40. If successful, when the UE transmits RRC Reconfiguration complete message to a target cell, the UE may
  indicate, in the message, existence of a first report; or
  add the first report to the message (operation 2*h*-45).

By doing so, when the stored report is successfully delivered to a network, the UE may discard the delivered report or contents of the variable for reporting (operation 2*h*-55).

If conditional handover performed in operation 2*h*-25 fails, the UE may write a second report on a failure in a variable for reporting and store it. In this case, the UE may not clear variable contents that are previously stored (operation 2*h*-50). Afterward, the UE may perform connection re-establishment, and in this regard,
  re-establishment Complete message may indicate existence of the second report (operation 2*h*-60).

The variable for reporting may include multiple failure reports. The multiple failure reports may respectively correspond to performance instances of RLF, handover failure, and conditional handover failure.

In the example above, the first report and the second report may have contents below.

They may have one of indicators below as connection Failure types: RLF, handover failure, and conditional handover failure. In a case of the conditional handover failure, whether it is initially-performed conditional handover, or conditional handover failure due to a failure in RLF/HOF/CHOF the number of failures occurred while a failure report is being recorded an absolute time when each failure event occurs, and in an additional embodiment, in a case of handover, as information of a target cell performed a failure event, PCI and ARFCN information or CGI information of the target cell is available when handover and conditional handover are performed. If conditional handover is performed, CHO candidate id information (or conditional reconfiguration id) for each tried target cell that performed conditional handover is additionally available. In a case of RLF, the cell information may correspond to information of a source cell in which the RLF occurred.

Depending on whether the report is transmitted in CHO procedure or in normal RRE procedure, failedCellId is set differently (CHO candidate id for the former and CGI for the later).

CHO related context if trial is the first CHO (measID associated to configured CHO execution condition for that selected target cell)

In addition, contents below may be added as contents of each failure report.

Next—
measResultLastServCell-r9: Last received signal power of a serving cell based on RSRP or RSRQ the UE measured before the failure, measResultNeighCells-r9: Last received signal power of a neighboring cell based on RSRP or RSRQ the UE measured before the failure,

. . . ,

[[locationInfo-r10: recent location information the UE measured before the failure, reestablishmentCellId-r10: CGI information of a corresponding target cell when the UE attempts re-establishment, timeConnFailure-r10: This field is used to indicate the time elapsed since the last HO initialization until connection failure. Actual value=field value*100 ms. The maximum value 1023 means 102.3 s or longer, previousPCellId-r10: This field is used to indicate the source PCell of the last handover (source PCell when the last RRC-Connection-Reconfiguration message including mobilityControlInfo was received).

]],
[[basicFields-r11: SEQUENCE{
c-RNTI-r11: C-RNTI,
rlf-Cause-r11: as an RLF cause, types below may be configured. {t310 Expiry, randomAccess Problem, rlc Maximum Number retransmission, t312 Expiry},
timeSinceFailure-r11: This field is used to indicate the time that elapsed since the connection (establishment) failure. Value in seconds. The maximum value 172800 means 172800 s or longer.}
End—

Figure 2I:
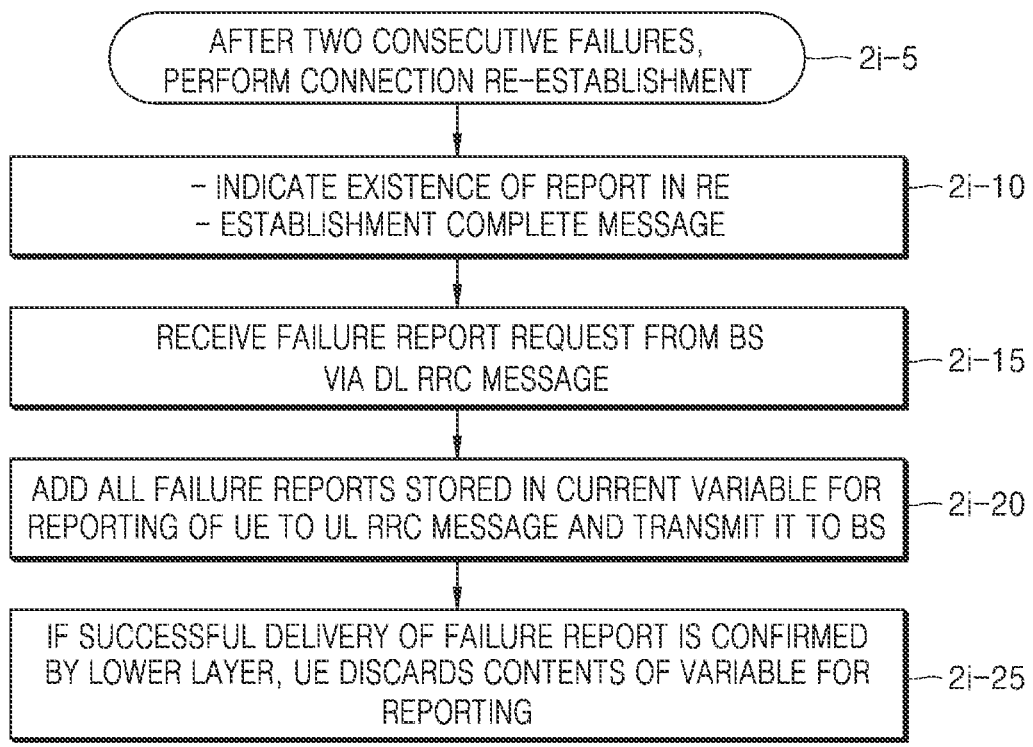
FIG. 2I is a diagram for describing UE operations of performing failure reporting after two consecutive failures, according to an embodiment of the disclosure.

FIG. 2I is a diagram for describing UE operations of performing failure reporting after two consecutive failures, according to an embodiment of the disclosure.

The two consecutive failures of the UE may indicate operation 2h-60 in FIG. 2H. After the two consecutive failures of the UE, the UE may perform an RRC connection re-establishment procedure (operation 2i-05). While performing the procedure, the UE may indicate existence of a report in a re-establishment complete message (operation 2i-10). The existence of the report on the two consecutive failures may be included in at least one of messages below and transmitted.

RRCConnectionSetupComplete,
RRCConnectionResumeComplete
RRCReconfigurationComplete
RRCConnectionReestablishmentComplete The UE may indicate the existence of the report in the re-establishment complete message, and may receive a failure report request from a BS via a DL RRC message (operation 2i-15). When the failure report request is received via the DL RRC message, the UE may add all failure reports stored in a current variable for reporting of the UE to an UL RRC message and transmit it to the BS (operation 2i-20). If a successful delivery of failure report is confirmed by a lower layer, the UE may discard contents of the variable for reporting (operation 2i-25).

FIG. 2J is a flowchart for describing UE operations of a case where an initial failure is conditional handover, in a method of transmitting, by a UE, a failure report after occurrence of two conditional handover failures.

The UE receives handover configuration information (cell information, performance condition, and configuration information by target cell) from a source cell, and starts to evaluate a condition of handover. When the condition is fulfilled at a certain point of time, and thus, the UE performs conditional handover to a particular target cell, a conditional handover failure detection timer may start. Afterward, if conditional handover fails and the conditional handover failure detection timer expires, the UE may regard the conditional handover as a failure, may write and store a failure report on a first failure and may perform cell selection. As a result of performing the cell selection, when a selected cell is a candidate cell for conditional handover which is already identified, the UE may perform conditional handover to the corresponding cell. When the UE performs conditional handover to the corresponding cell, the UE may start a conditional handover failure detection timer. If the performed conditional handover fails and the conditional handover failure detection timer expires, the UE may regard the conditional handover as a second failure, and may write and store a failure report on the second failure. Afterward, the UE may perform RRC connection re-establishment and may indicate existence of a failure report in a re-establishment complete message. When a target cell receives the indication indicating the existence of the failure report and then transmits a message indicating the failure report to the UE, the UE may transmit the failure report to the BS. In this case, the BS may include, in a DL RRC message, an indication indicating that only one most-recent report from among two failure reports is requested or stored two reports are requested. Upon reception of this information, the UE may transmit only the most-recent report or transmit the stored two reports to the BS. However, this is merely an example, and without an indication from a network, the UE may always transmit a most-recent report or may always transmit both stored two reports when connection success is RRE.

Figure 2K:
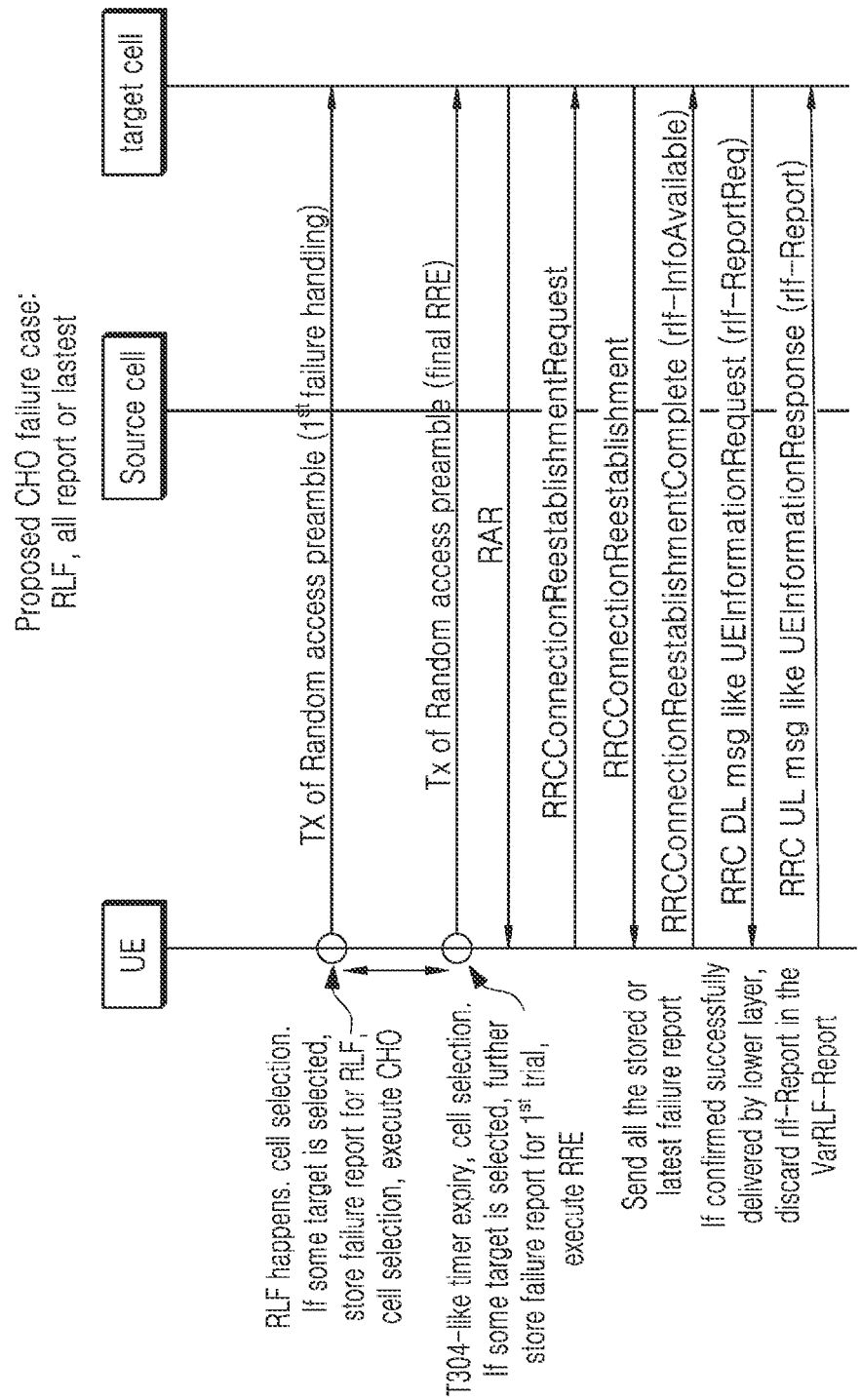
FIG. 2K is a flowchart for describing UE operations of a case where an initial failure is a radio link failure (RLF), in a method of transmitting, by a UE, a failure report after occurrence of two conditional handover failures, according to an embodiment of the disclosure.

FIG. 2K is a flowchart for describing UE operations of a case where an initial failure is an RLF, in a method of transmitting, by a UE, a failure report after occurrence of two conditional handover failures, according to an embodiment of the disclosure.

While the UE is connected to a source cell, the UE may declare an RLF. Here, as a first failure report, the UE may write and store a failure report on the RLF. In a case where a cell selected by performing cell reselection is a candidate cell for conditional handover which is already identified, the UE may perform conditional handover to the corresponding cell. The UE may perform conditional handover and may start a conditional handover failure detection timer. If the performed conditional handover fails and the timer expires, the UE may regard the conditional handover as a second failure, and may write and store a failure report on the second failure. Afterward, the UE may perform RRC connection re-establishment and may indicate existence of a report in a re-establishment complete message. When a target cell receives the indication and then transmits a message indicating the failure report to the UE, the UE may transmit the failure report to the BS. In this case, the BS may include, in a DL RRC message, an indication indicating that only one most-recent report from among two failure reports is requested or stored two reports are requested. Upon reception of this information, the UE may transmit only the most-recent report or transmit the stored two reports to the BS. However, this is merely an example, and according to another embodiment, without an indication from a network, the UE may always transmit a most-recent report or may always transmit both stored two reports when connection success is RRE.

Figure 2L:
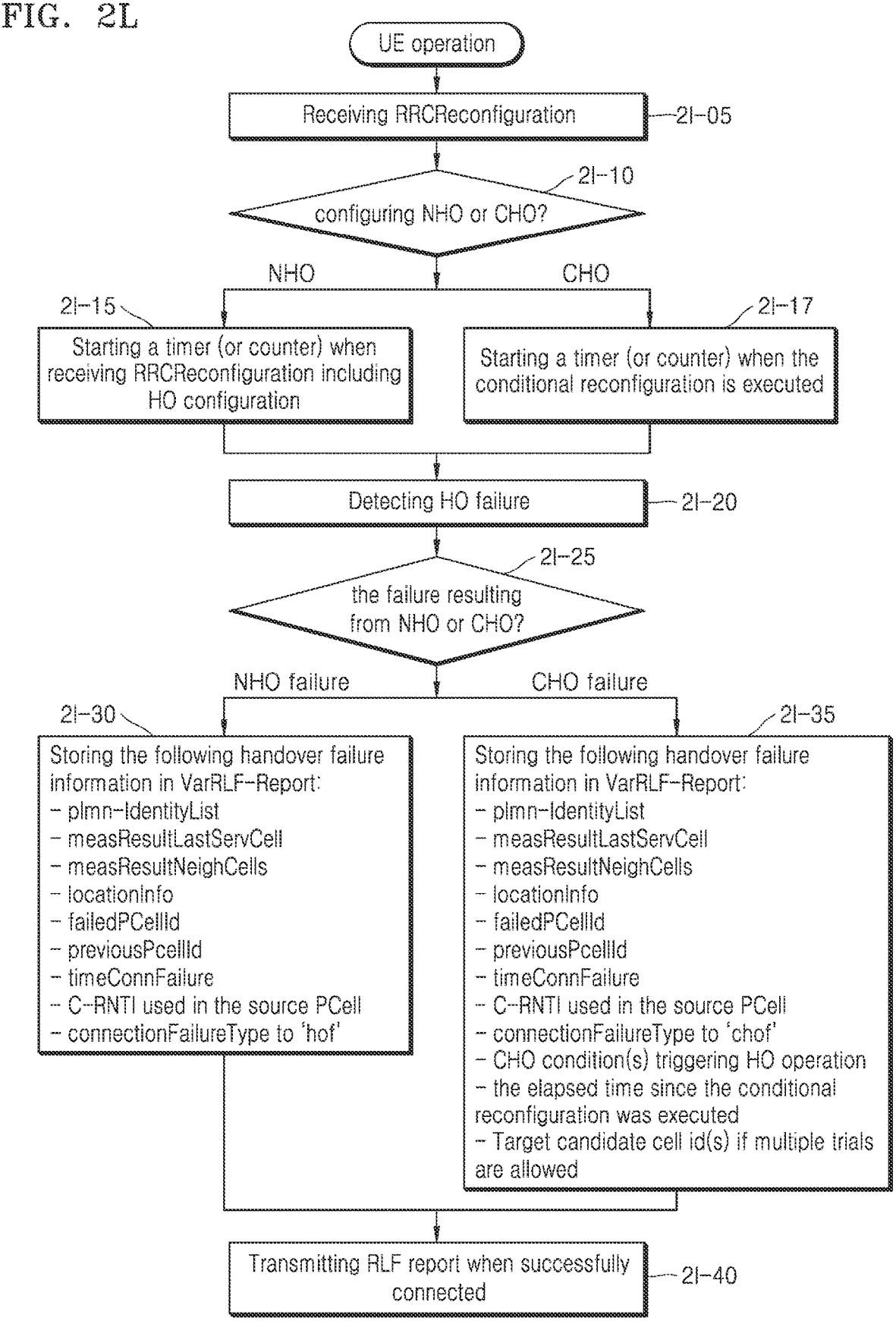
FIG. 2L is a flowchart for describing UE operations of storing preset time information when conditional handover is configured according to an embodiment of the disclosure.

FIG. 2L is a flowchart for describing UE operations of storing preset time information when conditional handover is configured according to an embodiment of the disclosure.

In operation 2*l*-05, a UE in a connected mode may receive RRCReconfiguration message from a serving BS. The RRCReconfiguration message may include handover configuration information, ReconfigurationWithSync IE or mobilibyControlInfo IE.

In operation 2*l*-10, the UE may determine whether the received handover configuration information is normal handover (NHO) or conditional handover (CHO). Upon reception of NHO configuration information, the UE may immediately perform NHO. In another example, CHO configuration information may include condition information for performing CHO. When the aforedescribed condition is fulfilled, the UE may perform CHO.

In operation 2*l*-15, if the UE receives the NHO configuration information, the UE may start one timer or counter when the UE receives the configuration information. The timer or counter is stopped when handover fails, and a value indicated by the timer or counter may be stored as one information included in an RLF report.

In operation 2*l*-17, if the UE receives the CHO configuration information, when a condition (or at least one of conditions) indicated by the configuration information is fulfilled and thus CHO is performed, the UE may start one timer or counter. The timer or counter is stopped when handover fails, and a value indicated by the timer or counter may be stored as one information included in an RLF report.

In operation 2*l*-20, the UE may detect failure in handover that is being performed. That is, if RRCReconfiguration-Complete message is not successfully transmitted to a target cell until T304 expires, it may be regarded that handover being performed fails. When a failure in handover being performed is detected, the UE may stop the running timer or counter.

In operation 2*l*-25, the UE may determine whether configured handover is NHO or CHO.

In operation 2*l*-30, if NHO has been triggered and an RLF occurs, the UE may collect and store information below.

measResultLastServCell: Wireless signal measurement information of a serving cell when the RLF occurs
  measResultNeighCells: Wireless signal measurement information of neighboring cells when the RLF occurs
  locationInfo: Location information of the UE when the RLF occurs
  failedPCellId: Cell ID of a serving PCell when the RLF occurs, or cell ID of a target PCell when handover fails. The cell ID is NCGI or PCI.
  previousPCellId: ID of a source PCell of last handover
  timeConnFailure: Time period information from HO initialization to the connection failure
  timeSicneFailure: Time period information after the connection failure
  C-RNTI used in the source PCell
  connectionFailureType set to 'hof'

In operation 2*l*-35, if CHO has been triggered and an RLF occurs, the UE may collect and store information below.
  measResultLastServCell: Same as described above
  measResultNeighCells: Same as described above
  locationInfo Same as described above
  failedPCellId: Same as described above
  previousPCellId: Same as described above
  timeConnFailure: Same as described above
  timeSicneFailure: Same as described above
  C-RNTI used in the source PCell: Same as described above
  connectionFailureType to 'chof': This defines a new cause to indicate handover failure occurrence while handover failure is being performed.
  CHO condition(s) triggering HO operation: Condition information for triggering a handover operation, e.g., a type of an event (Event A3, or the like), threshold information applied to a corresponding event, information of a cell measurement value when the event is fulfilled, conditional config id given as a condition or measurement id given as a condition, or the like.
  the elapsed time since the conditional reconfiguration was executed; Time period from a time when conditional handover is performed to a target cell fulfilling a configured condition to a time when RLF/handover failure occurs or a time period from a time when a configured condition is fulfilled to a time when RLF/handover failure occurs. The time information may be stored in a new field, imeConnFailureCHO, or may be stored in the existing timeConnFailure. If the information is stored in the existing timeConnFailure, the BS may identify, via the connectionFailureType to 'chof' information, that a value stored in the timeConnFailure is a time period from performance of CHO to connection failure.
  Target candidate cell id(s) if multiple trials are allowed: List information of IDs of a plurality of target cells when handover is performed to the plurality of target cells.

In operation 2*l*-40, when the UE successfully transitions to a connected mode, the UE may report stored information.

The methods according to the embodiments of the disclosure as described herein or in the following claims may be implemented as hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, configuration elements included in the disclosure are expressed in a singular or plural form according to the embodiments of the disclosure. However, the singular or plural form is appropriately selected for convenience of explanation and the disclosure is not limited thereto. As such, a configuration element expressed in a plural form may also be configured as a single element, and a configuration element expressed in a singular form may also be configured as plural elements.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, portions of an embodiment and portions of another embodiment of the disclosure may be combined with each other. For example, the BS and the UE may be operated in a manner that portions of an embodiment of the disclosure are combined with portions of another embodiment of the disclosure. Also, modifications based on the technical scope of the embodiments of the disclosure may be applied to various systems such as a Frequency Division Duplex (FDD) LTE system, a Time Division Duplex (TDD) LTE system, a 5G or NR system, or the like.

The invention claimed is:

1. A method performed by a user equipment (UE) in a wireless communication system, the method comprising:
   receiving, from a base station (BS), system information comprising a first cell selection receive level value (Srxlev) threshold for a relaxed measurement, a first cell selection quality value (Squal) threshold for the relaxed measurement and information associated with a mobility evaluation for the UE, wherein the first Srxlev threshold for the relaxed measurement is less than or equal to a second Srxlev threshold for normal inter-frequency measurement, and wherein the first Squal threshold for the relaxed measurement is less than or equal to a second Squal threshold for the normal inter-frequency measurement;
   determining, based on the first Srxlev threshold, the first Squal threshold and the information associated with the mobility evaluation for the UE, whether criteria for the relaxed measurement are fulfilled, wherein the criteria for the relaxed measurement include a condition that Srxlev of a serving cell of the UE is greater than the first Srxlev threshold for the relaxed measurement, and a condition that Squal of the serving cell is greater than the first Squal threshold for the relaxed measurement; and
   performing the relaxed measurement on an inter-frequency, based on a result of the determining.

2. The method of claim 1,
   wherein the system information further comprises priorities of different frequencies, and
   wherein the method further comprises:
      performing measurements of an inter-frequency with a priority higher than a priority of a current frequency, regardless of the Srxlev.

3. The method of claim 1,
   wherein the performing of the relaxed measurement on the inter-frequency comprises:
   performing the relaxed measurement on the inter-frequency according to a first measurement period about the relaxed measurement,
   wherein the first measurement period is longer than a second measurement period about a normal measurement, and
   wherein a unit of each of the first measurement period and the second measurement period is a number of discontinuous reception cycles (DRXs).

4. A user equipment (UE) in a wireless communication system, the UE comprising:
   a transceiver; and
   at least one processor coupled with the transceiver and configured to:
      receive, from a base station (BS) via the transceiver, system information comprising a first cell selection receive level value (Srxlev) threshold for a relaxed measurement, a first cell selection quality value (Squal) threshold for the relaxed measurement and information associated with a mobility evaluation for the UE, wherein the first Srxlev threshold for the relaxed measurement is less than or equal to a second Srxlev threshold for normal inter-frequency measurement, and wherein the first Squal threshold for the relaxed measurement is less than or equal to a second Squal threshold for the normal inter-frequency measurement,
   determine, based on the first Srxlev threshold, the first Squal threshold and the information associated with the mobility evaluation for the UE, whether criteria for the relaxed measurement are fulfilled, wherein the criteria for the relaxed measurement include a condition that Srxlev of a serving cell of the UE is greater than the first Srxlev threshold for the relaxed measurement, and a condition that Squal of the serving cell is greater than the first Squal threshold for the relaxed measurement, and
   perform the relaxed measurement on an inter-frequency, based on a result of the determination.

5. The UE of claim 4, wherein the system information further comprises priorities of different frequencies, and
   wherein the at least one processor is further configured to:
      perform measurements of an inter-frequency with a priority higher than a priority of a current frequency, regardless of the Srxlev.

6. The UE of claim 4,
wherein the at least one processor is further configured to perform the relaxed measurement on the inter-frequency according to a first measurement period about the relaxed measurement,
wherein the first measurement period is longer than a second measurement period about a normal measurement, and
wherein a unit of each of the first measurement period and the second measurement period is a number of discontinuous reception cycles (DRXs).

7. A method performed by a base station (BS) in a wireless communication system, the method comprising:
broadcasting system information comprising
a first cell selection receive level value (Srxlev) threshold for a relaxed measurement, and a first cell selection quality value (Squal) threshold for relaxed measurement information associated with a mobility evaluation for a user equipment (UE),
wherein the first Srxlev threshold for the relaxed measurement is less than or equal to a second Srxlev threshold for normal inter-frequency measurement,
wherein the first Squal threshold for the relaxed measurement is less than or equal to a second Squal threshold for the normal inter-frequency measurement,
wherein the first Srxlev threshold, the first Squal threshold and the information associated with the mobility evaluation for the UE are associated with criteria for the relaxed measurement, and
wherein the criteria for the relaxed measurement include a condition that Srxlev of a serving cell of the UE is greater than the first Srxlev threshold for the relaxed measurement, and a condition that Squal of the serving cell is greater than the first Squal threshold for the relaxed measurement.

8. A base station (BS) in a wireless communication system, the BS comprising:
a transceiver; and
at least one processor coupled with the transceiver and configured to:
broadcast system information comprising
a first cell selection receive level value (Srxlev) threshold for a relaxed measurement, a first cell selection quality value (Squal) threshold for the relaxed measurement and information associated with a mobility evaluation for a user equipment (UE),
wherein the first Srxlev threshold for the relaxed measurement is less than or equal to a second Srxlev threshold for normal inter-frequency measurement,
wherein the first Squal threshold for the relaxed measurement is less than or equal to a second Squal threshold for the normal inter-frequency measurement,
wherein the first Srxlev threshold, the first Squal threshold and the information associated with the mobility evaluation for the UE are associated with criteria for the relaxed measurement, and
wherein the criteria for the relaxed measurement include a condition that Srxlev of a serving cell of the UE is greater than the first Srxlev threshold for the relaxed measurement, and a condition that Squal of the serving cell is greater than the first Squal threshold for the relaxed measurement.

\* \* \* \* \*